United States Patent
Negishi et al.

(10) Patent No.: US 9,549,098 B2
(45) Date of Patent: Jan. 17, 2017

(54) IMAGE FORMING APPARATUS GENERATING CONVERSION CONDITION OF MEASUREMENT UNIT AND METHOD FOR CONTROLLING THE SAME

(71) Applicant: CANON KABUSHIKI KAISHA, Tokyo (JP)

(72) Inventors: Hayato Negishi, Toride (JP); Takahiro Nakase, Moriya (JP); Keizo Takura, Tokyo (JP); Atsushi Hori, Kamagaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/073,031

(22) Filed: Mar. 17, 2016

(65) Prior Publication Data

US 2016/0286091 A1  Sep. 29, 2016

(30) Foreign Application Priority Data

Mar. 23, 2015  (JP) ................................ 2015-060148

(51) Int. Cl.
  *H04N 1/40* (2006.01)
  *H04N 1/60* (2006.01)
  *G03G 15/01* (2006.01)
  *G06K 15/00* (2006.01)

(52) U.S. Cl.
  CPC ............ *H04N 1/6025* (2013.01); *G03G 15/01* (2013.01); *H04N 1/6027* (2013.01)

(58) Field of Classification Search
  CPC ..... H04N 1/6025; H04N 1/6027; G03G 15/01
  See application file for complete search history.

(56) References Cited

U.S. PATENT DOCUMENTS

| 8,229,307 | B2 | 7/2012 | Komiya | |
|---|---|---|---|---|
| 2007/0172245 | A1 | 7/2007 | Yoshida et al. | |
| 2011/0033196 | A1 | 2/2011 | Fuchimoto | |
| 2013/0156478 | A1* | 6/2013 | Deno | G03G 15/6567 399/395 |
| 2014/0255051 | A1* | 9/2014 | Itagaki | G03G 15/5062 399/49 |

OTHER PUBLICATIONS

Richter, Klaus, "Visual Methods and Image Reproduction in Non-Destructive Testing (NDT)", BAM Federal Institute for Materials Research and Testing, Dec. 20, 2007, pp. 1-3, Web, http://www.ps.bam.de/.

* cited by examiner

*Primary Examiner* — Quang N Vo
(74) *Attorney, Agent, or Firm* — Canon U.S.A., Inc. IP Division

(57) ABSTRACT

An image forming apparatus comprising: a controller controlling an image forming unit to form a test image, controlling a measurement unit to measure the test image on an image bearing member, and controlling a transfer unit to transfer the test image formed on the image bearing member to the sheet; a reception unit receiving a user instruction; and a second generation unit generating the conversion condition based on the user instruction and the measurement result of the test image, wherein the test image includes a first test image, a second test image, and an image indicating a position where the sheet is to be bent, and in a case where the sheet is bent along the position, a position of the first test image and a position of the second test image do not overlap with each other.

20 Claims, 16 Drawing Sheets

IMAGE FORMING APPARATUS GENERATING CONVERSION CONDITION OF MEASUREMENT UNIT AND METHOD FOR CONTROLLING THE SAME

BACKGROUND OF THE INVENTION

1. Field of the Invention

The present invention relates to correction control for correcting a characteristic of an image formed by an image forming apparatus.

2. Description of the Related Art

An image forming apparatus employing an electrophotographic method forms an electrostatic latent image based on image data on a photoconductor and develops the electrostatic latent image using a developing agent (toner) included in a developer device so as to form an image. To control the image formed by the image forming apparatus to have desired density, a measurement image formed by the image forming apparatus is measured and a correction condition is corrected in accordance with a result of the measurement.

U.S. Pat. No. 8,229,307 discloses an image forming apparatus which forms a measurement image on a photoconductor, measures the measurement image by a sensor, and corrects a correction condition in accordance with a result of the measurement performed by the sensor.

However, even in a case where the correction condition is corrected, desired density of an image formed on a sheet may not be obtained. This is caused by a measurement error of the sensor. If an error occurs in the result of the measurement performed by the sensor, density of the image formed by the image forming apparatus may not be corrected with high accuracy.

SUMMARY OF THE INVENTION

An image forming apparatus of the present invention includes a correction unit configured to correct image data based on a correction condition, an image forming unit configured to form an image based on the corrected image data, an image bearing member configured to bear the image formed by the image forming unit, a transfer unit configured to transfer the image on the image bearing member to a sheet, a measurement unit configured to measure a measurement image on the image bearing member, a conversion unit configured to convert a measurement result of the measurement image based on a conversion condition, a first generation unit configured to generate the correction condition based on the measurement result converted by the conversion unit, an obtaining unit configured to control the image forming unit to form a test image based on test image data, control the measurement unit to measure the test image on the image bearing member, and obtain a measurement result of the test image, a controller configured to control the image forming unit to form a test image based on test image data, and control the transfer unit to transfer the test image formed on the image bearing member to the sheet, a reception unit configured to receive a user instruction based on a result of comparison between a sample image and the test image by a user, and a second generation unit configured to generate the conversion condition based on the user instruction and the measurement result of the test image by the obtaining unit. The test image on the sheet includes a first test image, a second test image, and an image indicating a position where the sheet is to be bent. In a case where the sheet is bent along the position, a position of the first test image and a position of the second test image do not overlap with each other.

Further features of the present invention will become apparent from the following description of exemplary embodiments with reference to the attached drawings.

DESCRIPTION OF THE EMBODIMENTS

Figure 1:
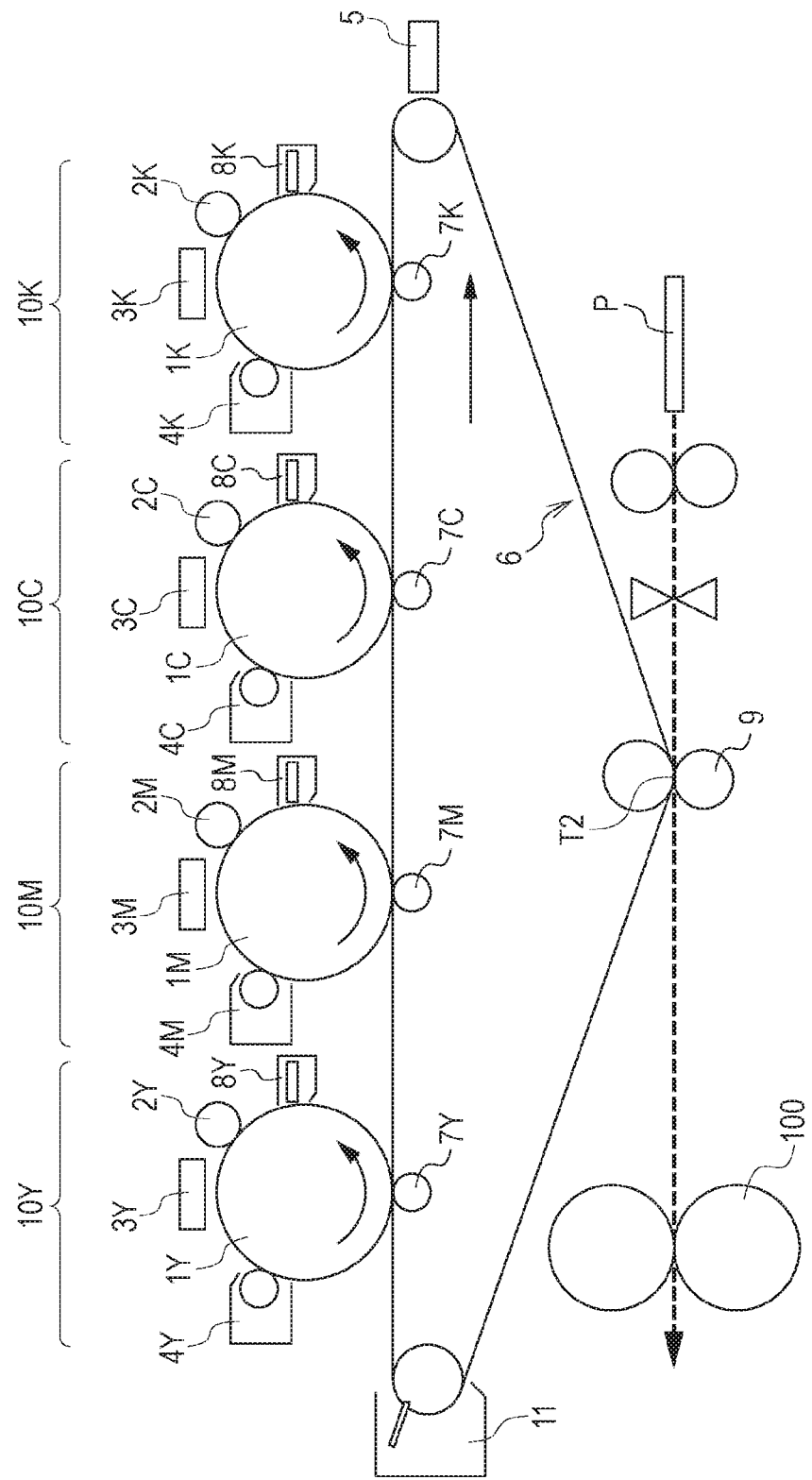
FIG. 1 is a cross-sectional view schematically illustrating an image forming apparatus.

FIG. 1 is a cross-sectional view schematically illustrating an image forming apparatus which forms a full-color image. The image forming apparatus includes four image forming stations 10Y, 10M, 10C, and 10K, and forms an image on a sheet P. The image forming station 10Y forms a yellow image, the image forming station 10M forms a magenta image, the image forming station 10C forms a cyan image, and the image forming station 10K forms a black image. A full-color image is formed on an intermediate transfer belt 6 by transforming images of the individual color components formed by the image forming stations 10Y, 10M, 10C, and 10K to the intermediate transfer belt 6 in an overlapping manner. The full-color image on the intermediate transfer belt 6 is transferred on the sheet P. After a fixing unit 100 fixes the image on the sheet P, the sheet P is discharged from the image forming apparatus.

The image forming stations 10Y, 10M, 10C, and 10K have the same configuration except that the image forming stations 10Y, 10M, 10C, and 10K accommodate different toners of different color components. Hereinafter, a configuration of the image forming station 10Y is described, and configurations of the other image forming stations 10M, 10C, and 10K are omitted.

The image forming station 10Y includes a photoconductive drum 1Y having a photoconductor formed on a surface thereof, a charger 2Y having a charging roller connected to a high voltage power source, an exposing device 3Y which exposes the photoconductive drum 1Y so as to form an electrostatic latent image, and a developer device 4Y which develops the electrostatic latent image using toner. The image forming station 10Y further includes a primary transfer roller 7Y which is disposed so as to face the photoconductive drum 1Y with the intermediate transfer belt 6 described below therebetween, and a drum cleaner 8Y which collects toner adhering to the photoconductive drum 1Y.

The intermediate transfer belt 6 is supported by a plurality of rollers and is driven to rotate by a driving roller connected to a motor not illustrated. A pair of secondary transfer rollers 9 which sandwich the intermediate transfer belt 6 therebetween forms a secondary transfer nip portion T2. A sheet P is conveyed toward the secondary transfer nip portion T2. The pair of secondary transfer rollers 9 is connected to a power source unit (not illustrated). The power source unit applies a secondary transfer voltage to the pair of secondary transfer rollers 9 while the sheet P passes the secondary transfer nip portion T2 so that the image on the intermediate transfer belt 6 is transferred to the sheet P in the secondary transfer nip portion T2. A belt cleaner 11 presses an elastic member of a plate shape on the intermediate transfer belt 6 so as to collect toner on the intermediate transfer belt 6. Furthermore, a density detection sensor 5 measures a measurement image formed on the intermediate transfer belt 6. The density detection sensor 5 will be described later with reference to FIG. 4.

A fixing device 100 includes a pair of rollers which presses a sheet and a heater which heats a sheet. The fixing device 100 heats the sheet P while pressing the sheet P so as to firmly fix the image on the sheet P which has not been fixed to the sheet P. The sheet P on which the image is fixed is output from the image forming apparatus.

Next, an image forming operation of forming an image based on image data supplied from a PC, a scanner, or the like, not illustrated, which is performed by the image forming apparatus will be described.

In the image forming station 10Y, the photoconductive drum 1Y is driven to rotate in a direction indicated by an arrow mark by the motor not illustrated. Then the charger 2Y uniformly charges the photoconductive drum 1Y, and the exposing device 3Y exposes the photoconductive drum 1Y with exposure light. By this, an electrostatic latent image corresponding to the yellow color component is formed on the photoconductive drum 1Y. The electrostatic latent image on the photoconductive drum 1Y is developed by the developer device 4Y using yellow toner. A yellow image is formed on the photoconductive drum 1Y.

The yellow image on the photoconductive drum 1Y is conveyed to a primary transfer nip portion where the primary transfer roller 7Y presses the photoconductive drum 1Y through the intermediate transfer belt 6 when the photoconductive drum 1Y rotates in the direction indicated by the arrow mark. A primary transfer voltage is applied from a power source unit (not illustrated) to the primary transfer roller 7Y. By this, the yellow image on the photoconductive drum 1Y is transferred to the intermediate transfer belt 6 in the primary transfer nip portion. Furthermore, toner which remains in the photoconductive drum 1Y is removed by the drum cleaner 8Y.

Images formed by the image forming stations 10Y, 10M, 10C, and 10K are transferred to the intermediate transfer belt 6. When the images are transferred in an overlapping manner on the intermediate transfer belt 6, a full-color image is formed on the intermediate transfer belt 6. The image held by the intermediate transfer belt 6 is transferred to the secondary transfer nip portion T2. The sheet P is conveyed such that the image on the intermediate transfer belt 6 is in contact with the sheet P in the secondary transfer nip portion T2. The image on the intermediate transfer belt 6 is transferred to the sheet P by the pair of secondary transfer rollers 9 to which a secondary transfer voltage has been applied. Note that toner which is not transferred to the sheet P in the secondary transfer nip portion T2 but remains in the intermediate transfer belt 6 is removed by the belt cleaner 11.

The sheet P which holds the image is conveyed to the fixing device 100. The fixing device 100 applies heat and pressure on the sheet P which holds the unfixed image so as to fix the unfixed image on the sheet P in a melting manner.

Figure 2:
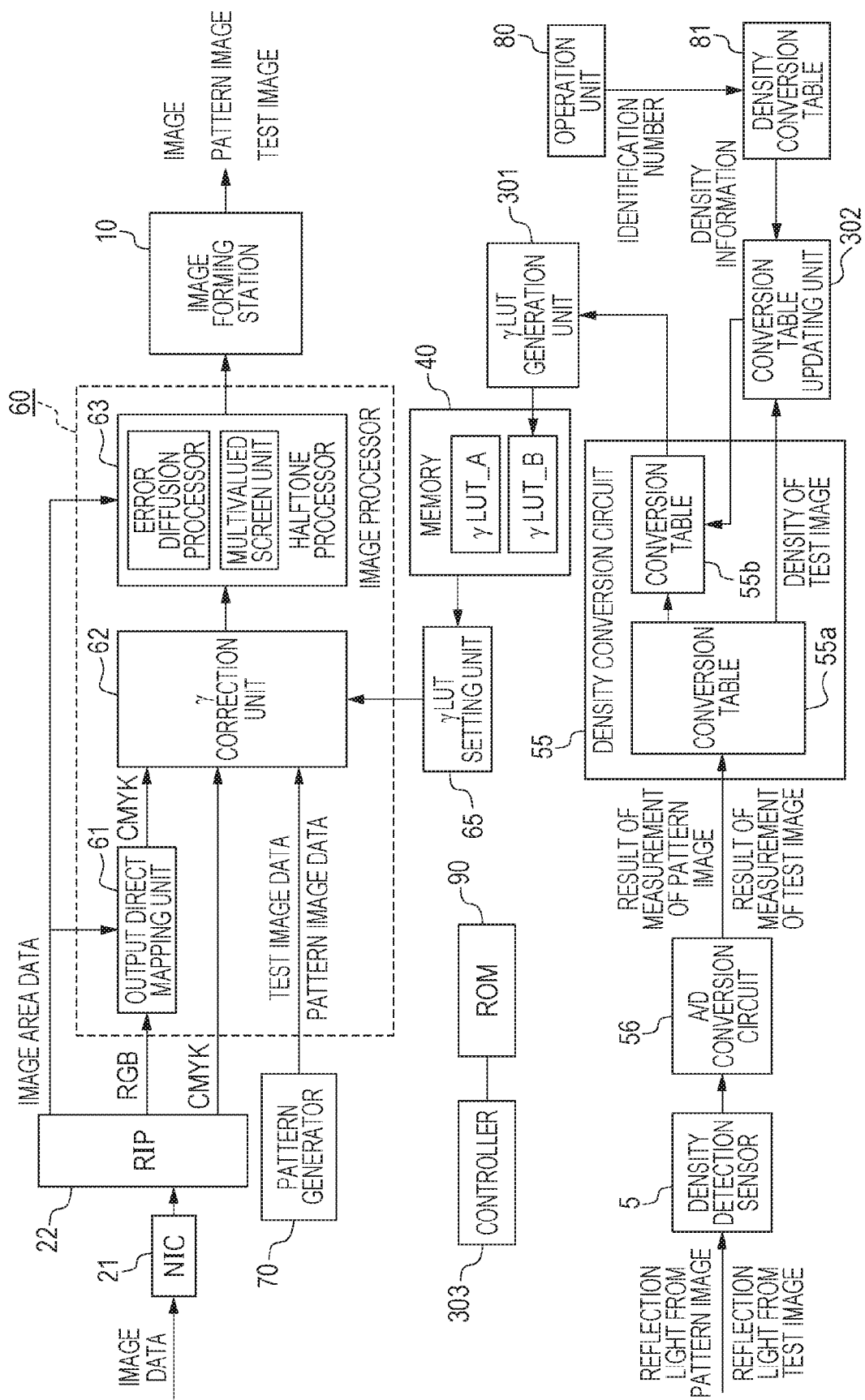
FIG. 2 is a block diagram illustrating the image forming apparatus.

Next, a control block diagram of the image forming apparatus is illustrated in FIG. 2. A controller 303 is a control circuit which controls various units. A ROM 90 stores various programs therein. A memory 40 stores a look-up table (hereinafter referred to as a γ LUT) used to correct a tone characteristic and stores an image forming condition, such as intensity of laser light of exposing devices 3Y, 3M, 3C, and 3K. An image forming station 10 corresponds to the image forming stations 10Y, 10M, 10C, and 10K. The image forming station 10 has been described hereinabove, and therefore, a description thereof is omitted here.

A network interface card (NIC) unit 21 transmits image data supplied through a network to a RIP unit 22 and transmits apparatus information to an outside through the network. The RIP unit 22 analyzes image data described by a page description language (PDL) and develops the image data. The RIP unit 22 outputs image area data of the image data and density signals of pixels in the image data (RGB data or CMYK data) in accordance with a result of the analysis performed on the image data.

An image processor 60 performs various image processes on image data so as to correct the image data. The image processor 60 may be realized by an integrated circuit, such as an application specific integrated circuit (ASIC), or may be realized when a CPU of the controller 303 corrects image data in accordance with a program stored in advance.

Examples of the image data input to the image processor 60 includes RGB data obtained by digitalizing three color components, that is, R (red), G (green), and B (blue), and CMYK data obtained by digitalizing four color components, that is, C (cyan), M (magenta), Y (yellow), and K (black). An output direct mapping unit 61 converts RGB data into CMYK data in a case where the RIP unit 22 transfers RGB data and image area data to the image processor 60.

A γ correction unit 62 corrects the tone characteristic of image data. An image formed by the image forming apparatus does not have desired density. Therefore, the γ correction unit 62 corrects an input value (an image signal value) of image data so that an image formed by the image forming apparatus has desired density. The γ correction unit 62 corrects the tone characteristic of the image data (CMYK data) in accordance with a γ LUT_A and a γ LUT_B stored in the memory 40. Note that the γ LUT_A and the γ LUT_B are stored in the memory 40 for each color component. The γ LUT_A and the γ LUT_B are tone correction tables which correct an input value of image data.

Here, the γ LUT_A and the γ LUT_B will be now described. The γ LUT_A is a correction condition for correcting a printer characteristic of the image forming apparatus to an ideal tone characteristic in a case where the image forming apparatus operates in a predetermined environmental condition and in a standard state of a predetermined charge amount of the developing agent. The γ LUT_A is determined through an experiment in advance. However, the printer characteristic of the image forming apparatus changes depending on temperature and humidity around the image forming apparatus, the number of formed images, a charge amount of the developing agent, and the like. Therefore, density of an image formed by the image forming apparatus changes depending on temperature and humidity around the image forming apparatus, the number of formed images, a charge amount of the developing agent, and the like.

Therefore, the image forming apparatus includes the γ LUT_B used to correct the γ LUT_A. The γ LUT_B is correction data which corrects the image data corrected in accordance with the γ LUT_A so as to obtain image data suitable for a state of the image forming apparatus currently used. The γ LUT_B obtains a printer characteristic of the current image forming apparatus and is changed in accordance with the printer characteristic. In a case where an image based on image data is to be formed, the γ correction unit 62 corrects the image data in accordance with a γ LUT obtained by combining the γ LUT_A and the γ LUT_B.

A halftone processor 63 performs screening suitable for image area data on image data (CMYK data) corrected by the γ correction unit 62. By this, the image data (CMYK data) which is multivalued data for individual pixels is converted into binary data for individual pixels. For example, the screening is performed using a dither matrix so that a character region is clearly printed. For example, the screening is performed on a photographic image region using an error diffusion method so that moire is suppressed. Since the screening is a general technique, a detailed description thereof is omitted.

Image data converted by the image processor 60 is transferred to an exposing device 3 of the image forming station 10. The exposing device 3 of the image forming station 10 is controlled based on the image data converted by the image processor 60. The exposing device 3 exposes the photoconductive drum 1 so as to form an electrostatic latent image based on the image data on the photoconductive drum 1. Since the image forming operation is described hereinabove, a description thereof is omitted here.

An operation unit 80 includes a power switch of the image forming apparatus, a mode selection button for selecting a mode of the image forming apparatus, a numeric keypad, a determination button, and a liquid crystal screen. The liquid crystal screen displays information on an amount of remaining toner accommodated in the developer devices 4Y, 4M, 4C, and 4K and an image associated with image data.

The density detection sensor 5 includes an LED 51 and photodiodes 52 and 53. In the density detection sensor 5, the LED 51 irradiates a measurement image with light and the photodiodes 52 and 53 receive the light reflected by a measurement image. The photodiodes 52 and 53 output sensor output values (voltage values) in accordance with intensity of the reflection light from the measurement image.

Note that the LED 51 functions as an irradiation unit which irradiates the measurement image with light. The photodiodes 52 and 53 function as light receiving units which receive reflection light from the measurement image.

A pattern generator 70 generates measurement image data for forming a measurement image. The pattern generator 70 outputs pattern image data in a case where the tone characteristic of the image forming station 10 is to be corrected. Furthermore, the pattern generator 70 outputs test image data in a case where a conversion table 55b is to be corrected. Note that automatic tone correction for correcting the tone characteristic of the image forming station 10 will be described in detail with reference to FIGS. 6 to 8, and visual correction for correcting the conversion table 55b will be described in detail with reference to FIGS. 9 to 11.

An A/D conversion circuit 56 converts a sensor output value (a voltage value) of the density detection sensor 5 into a sensor output value (a digital signal) of a level in a range from 0 to 255. A density conversion circuit 55 converts the sensor output value (the digital signal) into density (print density) of a measurement image on the sheet P in accordance with a conversion table. The density conversion circuit 55 includes a conversion table 55a and the conversion table 55b.

The conversion table 55a is determined in advance by an experiment. Therefore, if the correspondence relationship between a result of measurement of a measurement image performed by the density detection sensor 5 and print density is changed, the print density of the measurement image may not be estimated with high accuracy only using the conversion table 55a. Accordingly, the density conversion circuit 55 additionally includes the conversion table 55b for correcting a result of conversion performed using the conversion table 55a to compensate for the accuracy of the density conversion circuit 55. The conversion tables 55a and 55b correspond to conversion conditions for converting a sensor output value into density.

A conversion table updating unit 302 updates the conversion table 55b in accordance with density of a test image on the sheet P visually determined by the user and density of the test image measured by the density detection sensor 5. A density conversion table 81 stores data indicating the correspondence relationships between density levels of sample images in a sample chart illustrated in FIG. 9 and identification numbers of the sample images. The density conversion table 81 outputs density corresponding to an identification number input by the operation unit 80 to the conversion table updating unit 302. In this way, the conversion table updating unit 302 may obtain density of a test image on the sheet P which is visually determined by the user.

A γ LUT generation unit 301 corrects the γ LUT_B in accordance with a result of measurement of a pattern image on the intermediate transfer belt 6 and combines the γ LUT_A and the γ LUT_B so as to generate a γ LUT_C.

A γ LUT setting unit 65 sets a γ LUT used by the γ correction unit 62 to correct image data and a γ LUT used by the γ correction unit 62 to correct measurement image data. In a case where the image forming apparatus forms an image based on image data input by the PC, the scanner, or the like, not illustrated, the γ LUT setting unit 65 sets the γ LUT_C obtained by combining the γ LUT_A and the γ LUT_B to the γ correction unit 62. Furthermore, in a case where the automatic tone correction is executed to correct the γ LUT_B, the γ LUT setting unit 65 sets the γ LUT_A to the γ correction unit 62.

Hereinafter, three characteristic control operations of the image forming apparatus will be described. As a first control operation, operations of the units performed in a case where the image forming apparatus forms an image based on image data supplied from the PC, the scanner, or the like, not illustrated will be described. When the image data is input, the γ LUT setting unit 65 sets the γ LUT_C obtained by combining the γ LUT_A and the γ LUT_B to the γ correction unit 62. The γ correction unit 62 corrects the image data in accordance with the γ LUT_C. By the process described above, the image forming apparatus forms an image based on the image data on the sheet P.

As a second control operation, operations of the units performed in a case where the automatic tone correction for correcting the γ LUT_B is executed will be described. The pattern generator 70 transfers pattern image data to the γ correction unit 62. The γ LUT setting unit 65 sets the γ LUT_A stored in the memory 40 in advance to the γ correction unit 62. The γ correction unit 62 corrects the pattern image data in accordance with the γ LUT_A. Then the image forming station 10 forms a pattern image on the intermediate transfer belt 6. The density detection sensor 5 measures the pattern image on the intermediate transfer belt 6. A sensor output value of the density detection sensor 5 is converted into a digital signal by the A/D conversion circuit 56. The density conversion circuit 55 converts the digital signal into print density in accordance with both of the conversion tables 55a and 55b. Then a γ LUT generation unit 301 corrects the γ LUT_B so that the print density converted by the density conversion circuit 55 corresponds to target density and generates the γ LUT_C by combining the γ LUT_A and the γ LUT_B.

As a third control operation, operations of the units performed in a case where visual correction for correcting the conversion table 55b is executed will be described. The pattern generator 70 transfers test image data to the γ correction unit 62. The γ LUT setting unit 65 sets the γ LUT_C to the γ correction unit 62. The γ correction unit 62 corrects the test image data in accordance with the γ LUT_C. Then the image forming station 10 forms a test image on the sheet P and the image forming apparatus outputs a test sheet.

The pattern generator 70 transfers the test image data to the γ correction unit 62. The γ correction unit 62 corrects the test image data in accordance with the γ LUT_C. Then the image forming station 10 forms a test image on the intermediate transfer belt 6. The density detection sensor 5 measures the test image on the intermediate transfer belt 6. A sensor output value of the density detection sensor 5 is converted into a digital signal by the A/D conversion circuit 56. The density conversion circuit 55 converts the digital signal into print density in accordance with the conversion table 55a. Thereafter, the conversion table updating unit 302 changes the conversion table 55b in accordance with the print density converted by the density conversion circuit 55 and density information input by the user using the operation unit 80.

Figure 3:
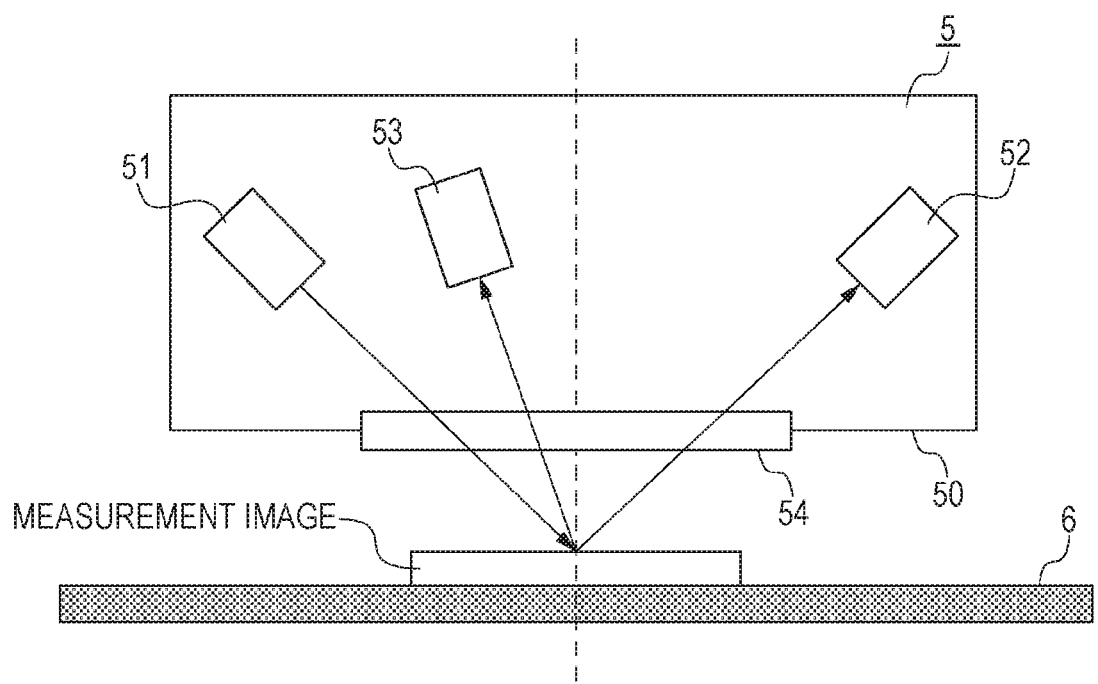
FIG. 3 is a diagram schematically illustrating a main portion of a density detection sensor.

Next, a configuration of the density detection sensor 5 included in the image forming apparatus will be described with reference to FIG. 3. The density detection sensor 5 includes a case unit 50 which accommodates the LED 51, the photodiodes 52 and 53, an electric substrate (not illustrated), and various elements and a window portion 54 formed on the case unit 50. The density detection sensor 5 may further include an optical element, such as a lens.

The LED 51 is a light emitting element which irradiates a measurement image formed on the intermediate transfer belt 6 with light. A wavelength of the light emitted from the LED 51 is in a range from 800 to 850 nm, for example, taking spectral reflectance of the toner into consideration. The light is emitted from the LED 51 so as to be inclined by an angle of 45 degrees relative to a direction orthogonal to a surface of the intermediate transfer belt 6.

The photodiode 52 is disposed on a virtual line which is inclined by an angle of 45 degrees relative to the direction orthogonal to the surface of the intermediate transfer belt 6. For example, the LED 51 and the photodiode 52 are disposed in symmetric positions with respect to a surface which is orthogonal to the surface of the intermediate transfer belt 6. The photodiode 52 receives specular reflection light from a measurement image on the intermediate transfer belt 6. The photodiode 52 outputs a sensor output value (a voltage value) in accordance with intensity of the reflection light from the measurement image.

The photodiode 53 is disposed in a certain position so as not to receive the specular reflection light from the intermediate transfer belt 6. The photodiode 53 is disposed on a virtual line which is inclined by an angle of 20 degrees, for example, relative to the direction orthogonal to the surface of the intermediate transfer belt 6. The photodiode 53 receives irregular reflection light from the measurement image on the intermediate transfer belt 6. The photodiode 53 outputs a sensor output value (a voltage value) in accordance with intensity of the reflection light from the measurement image.

The density detection sensor 5 measures, in a case where density of a measurement image of black is to be measured, specular reflection light from the measurement image. Therefore, in a case where the density detection sensor 5 detects the density of the measurement image of black, the density conversion circuit 55 converts a sensor output value of the photodiode 52 into density. Meanwhile, the density detection sensor 5 measures, in a case where density of a measurement image of yellow, density of a measurement image of magenta, and density of a measurement image of cyan are to be measured, irregular reflection light from measurement images. Therefore, in a case where the density detection sensor 5 detects the density of the measurement image of yellow, the density of the measurement image of magenta, the density of the measurement image of cyan, the density conversion circuit 55 converts a sensor output value of the photodiode 53 into density.

Note that one of the sensor output values of the photodiodes 52 and 53 is used to determine print density of a measurement image. However, the conversion into the print density may be performed in accordance with both of the sensor output values of the photodiodes 52 and 53.

The density detection sensor 5 measures a measurement image on the intermediate transfer belt 6. Therefore, the density conversion circuit 55 converts a result of the measurement performed by the density detection sensor 5 into density (print density) of a measurement image on the sheet P in accordance with a conversion table. A case where the density detection sensor 5 measures a measurement image of black on the intermediate transfer belt 6 and the density conversion circuit 55 converts a sensor output value into print density will be described hereinafter.

The LED 51 irradiates the intermediate transfer belt 6 with light. A region on which the light from the LED 51 is incident corresponds to a measurement position. While a measurement image (black) on the intermediate transfer belt 6 passes the measurement position described above, the photodiode 52 receives reflection light from the measurement image (black). A sensor output value (a voltage value) output from the photodiode 52 while the photodiode 52 receives the reflection light from the measurement image (black) corresponds to density of the measurement image (black).

After the A/D conversion circuit 56 converts the sensor output value (the voltage value) into a sensor output value (a digital signal) of 8 bits, the density conversion circuit 55 converts the sensor output value of the photodiode 52 into a density Dblack of the measurement image of black. Note that the density Dblack corresponds to density data of the measurement image of black.

In a case where the relationship between density of measurement image formed on the sheet P and sensor output value is changed, for example, the density of the measurement image may not be detected with high accuracy even if the density conversion circuit 55 converts the sensor output value in accordance with the conversion table 55a. To compensate for a result of the high-accuracy measurement of the measurement image, the density conversion circuit 55 converts the sensor output value into print density in accordance with both of the conversion tables 55a and 55b. Note that the conversion table 55b which is stored in the memory 40 in advance before the visual correction is performed is data in which density before conversion and density after conversion are the same as each other. The conversion table 55b functions as correction data for correcting the conversion table 55a so as to compensate for a result of the high-accuracy measurement of the measurement image when the visual correction is performed.

Furthermore, in a case where the density detection sensor 5 measures a measurement image of yellow, the controller 303 converts a sensor output value of the photodiode 53 into print density of the measurement image of yellow in accordance with a conversion table corresponding to the measurement image of yellow. Similarly, in a case where the density detection sensor 5 measures a measurement image of magenta, the controller 303 converts a sensor output value of the photodiode 53 into print density of the measurement image of magenta in accordance with a conversion table corresponding to the measurement image of magenta. Similarly, in a case where the density detection sensor 5 measures a measurement image of cyan, the controller 303 converts a sensor output value of the photodiode 53 into print density of the measurement image of cyan in accordance with a conversion table corresponding to the measurement image of cyan. The memory 40 stores the conversion table 55a and the conversion table 55b in advance.

Figure 4:
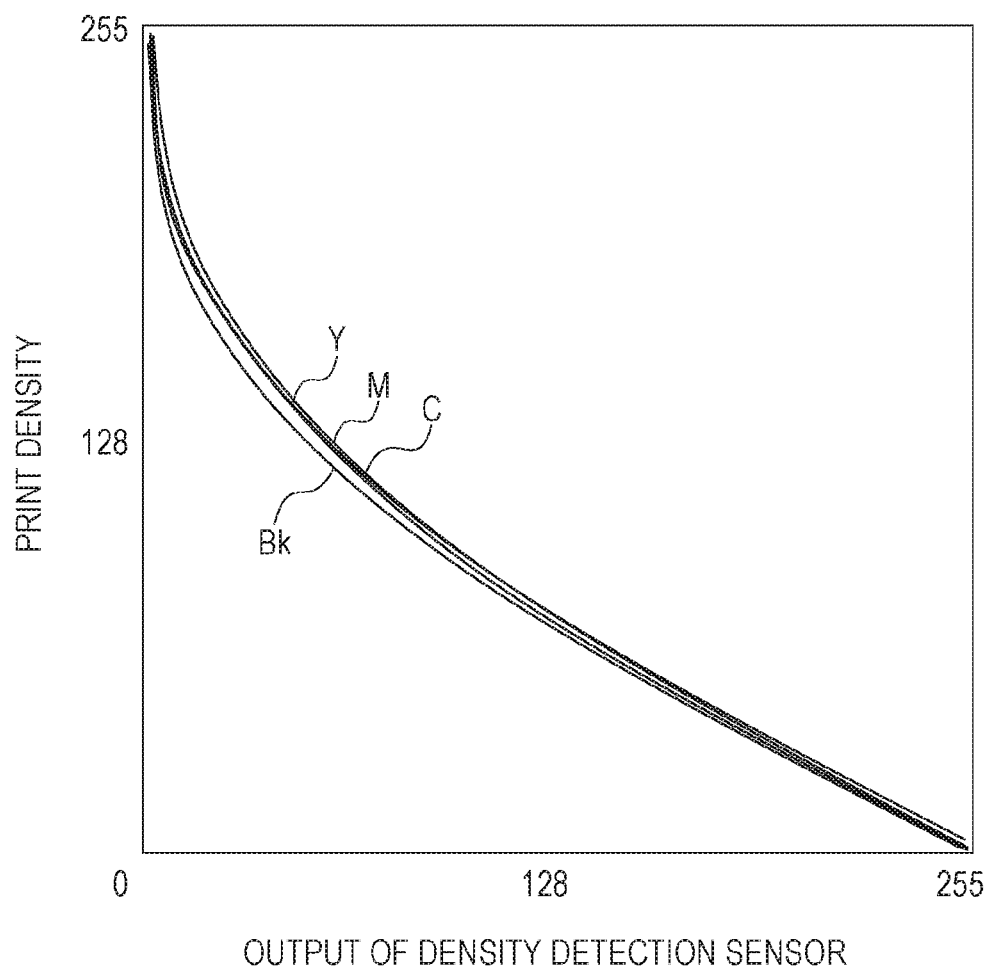
FIG. 4 is a graph illustrating a conversion table.

FIG. 4 is a graph illustrating the conversion table 55a. In FIG. 4, the relationship between a sensor output value of the density detection sensor 5 corresponding to a measurement image and print density of the measurement image in a case where density of the measurement image on the intermediate transfer belt 6 is changed in a step-by-step manner in accordance with area coverage modulation is illustrated. If an area covering ratio of the toner of the measurement image is increased, density of the measurement image on the sheet P is also increased. If the area covering ratio of the toner is increased, an amount of reflection light from the measurement image is reduced. As an amount of light received by a photodiode is reduced, a sensor output value is reduced. Therefore, as the sensor output value is reduced, the density of the measurement image on the sheet P is increased. On the other hand, if the area covering ratio of the toner of the measurement image is reduced, the density of the measurement image on the sheet P is also reduced. If the area covering ratio of the toner is reduced, the amount of reflection light from the measurement image is increased. As the amount of light received by a photodiode is increased, a sensor output value is increased. Therefore, as the sensor output value is increased, the density of the measurement image on the sheet P is reduced.

Tone Correction Control

Figure 5A:
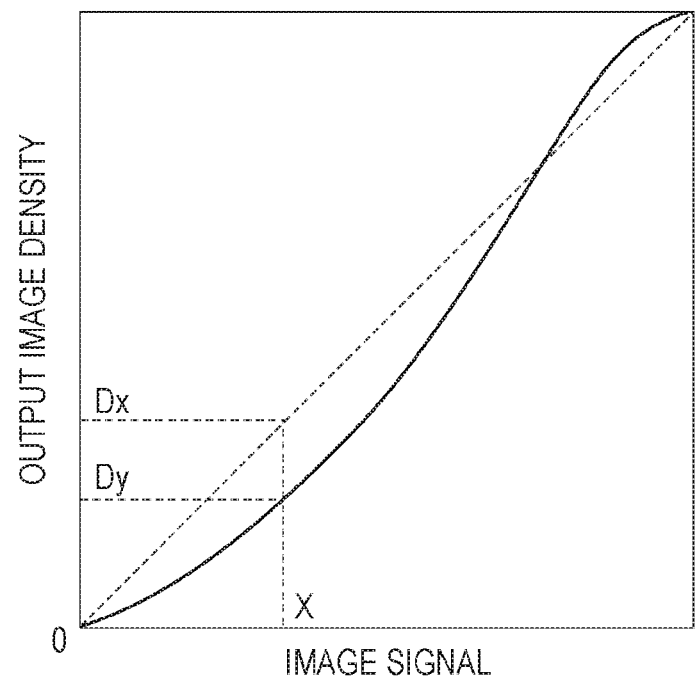
FIGS. 5A and 5B are graphs illustrating the relationships among a toner applying amount, print density, and a sensor output value.
Figure 5B:
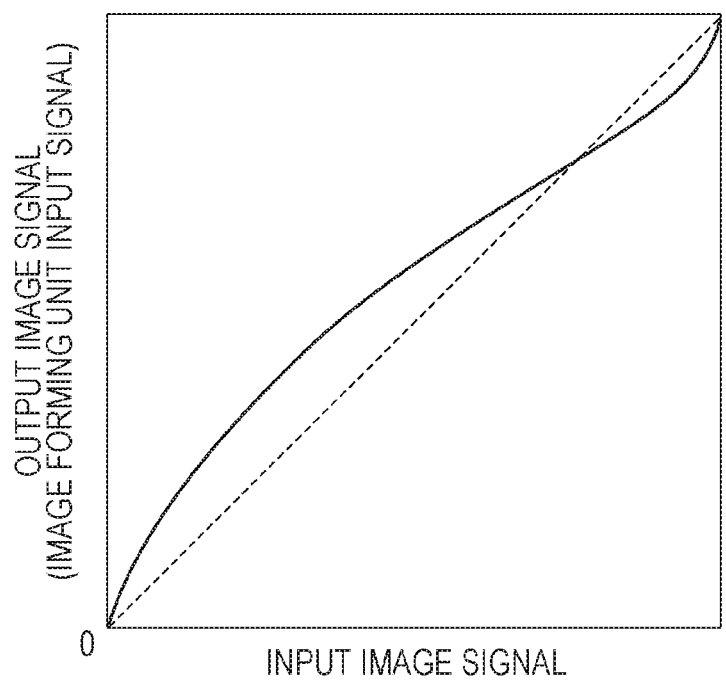

FIG. 5A is a graph illustrating the printer characteristic of the image forming apparatus. FIG. 5B is a graph illustrating the γ LUT used to correct the printer characteristic of the image forming apparatus of FIG. 5A. Dotted lines in FIGS. 5A and 5B indicate an ideal tone characteristic. It is assumed that, in a description below, print density is proportional to an input value of image data in the ideal tone characteristic (the dotted lines).

As illustrated in FIG. 5A, in a case where the image forming apparatus forms an image in accordance with an image signal X, the image has a density Dy. However, an image to be formed by the image forming apparatus in accordance with the image signal X has a density Dx. Therefore, the γ correction unit 62 is required to correct the image signal X so that the image formed in accordance with the image signal X has the density Dx. Here, the γ LUT for correcting the image signal X is generated as follows. First, the relationship between the relationship between the image signal X and the target density Dx and an image signal X' corresponding to the image having the target density Dx is determined. Thereafter, data for correcting the image signal X into the image signal X' is generated in accordance with the relationship described above. The generated data corresponds to the γ LUT_A.

However, the printer characteristic of the image forming apparatus changes in a case where the image forming apparatus forms a plurality of images or in a case where temperature or humidity around the image forming apparatus changes. Therefore, the image forming apparatus forms a pattern image on the intermediate transfer belt 6 in a case where a certain condition is satisfied and updates the γ LUT in accordance with a result of measurement performed on the pattern image. This operation corresponds to the automatic tone correction.

Examples of the certain condition for executing the automatic tone correction include a time immediately after a main power of the image forming apparatus is turned on and the number of pages of images printed after preceding automatic tone correction is executed which is larger than a predetermined number of pages. Note that the image forming apparatus may be configured such that the controller 303 executes the automatic tone correction in a case where a user inputs a command for instructing execution of the automatic tone correction using the operation unit 80.

In a case where an image is to be formed in accordance with image data transferred from the PC or the scanner, not illustrated, the γ correction unit 62 corrects the image data in accordance with the γ LUT_C obtained by combining the γ LUT_A and the γ LUT_B. The γ LUT_B is correction data for correcting the γ LUT_A to generate the γ LUT_C suitable for a current printer characteristic. The controller 303 controls the image forming station 10 so as to form a pattern image on the intermediate transfer belt 6. Then the γ LUT generation unit 301 updates the γ LUT_B in accordance with a result of measurement performed on the pattern image by the density detection sensor 5 and combines the γ LUT_A and the γ LUT_B so as to generate the γ LUT_C.

Figure 6A:
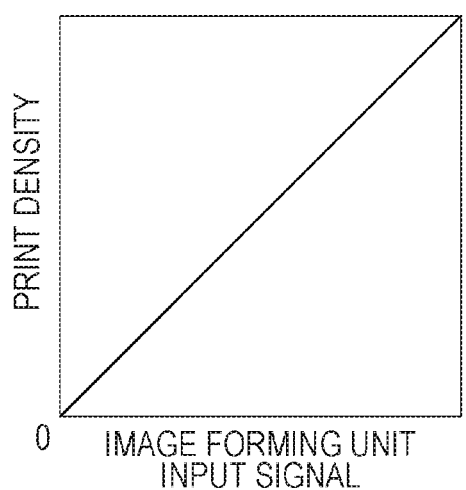
FIGS. 6A to 6C are diagrams schematically illustrating a process of generating correction data used to correct a γ LUT.
Figure 6B:
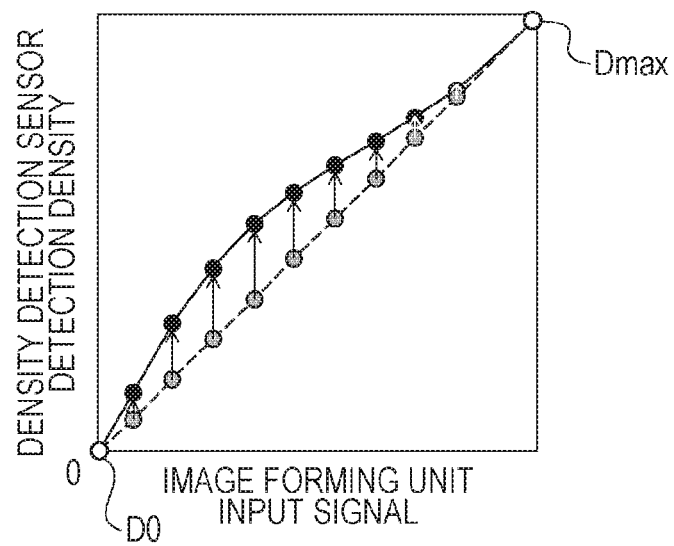
Figure 6C:
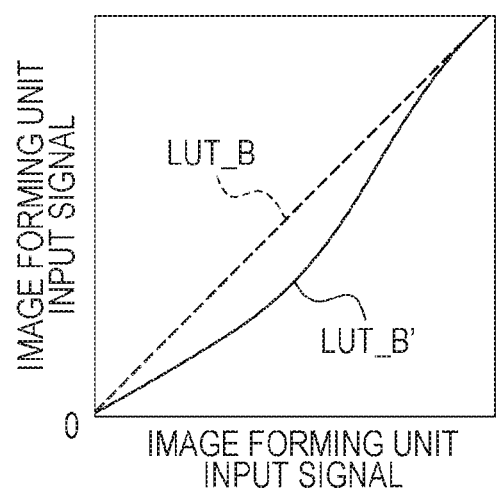

FIGS. 6A to 6C are diagrams schematically illustrating a state in which the γ LUT_B is updated. FIG. 6A is a graph illustrating an ideal density characteristic. FIG. 6B is a graph illustrating a density characteristic indicating the relationship between a value of a signal input by an image forming unit at a time when the pattern image is formed on the intermediate transfer belt 6 and a result of measurement performed by the density detection sensor 5 on the pattern image. Note that the signal input by the image forming unit represents a corrected image signal. Specifically, in FIG. 6B, the signal input by the image forming unit obtained at a time when the pattern image is formed corresponds to a signal value obtained when the γ correction unit 62 corrects an input value of pattern image data in accordance with the γ

LUT_A. The pattern image includes nine pattern images and the different pattern images correspond to different input values.

In FIG. 6B, white circles indicate target density values corresponding to the value of the signal input by the image forming unit and black circles indicate density values detected by the density detection sensor 5. A measurement result D0 on the surface of the intermediate transfer belt 6 on which any pattern image is not formed remains to be 0 (a fixed value) even if the printer characteristic of the image forming apparatus is changed. Furthermore, although a pattern image corresponding to a maximum value of the value of the signal input by the image forming unit is not formed, a density value of the pattern image corresponding to the maximum value of the value of the signal input by the image forming unit is estimated from results of measurement of the nine pattern images.

The reason that a pattern image of high density is not formed is that the density detection sensor 5 is not capable of measuring a change of a toner applying amount of the pattern image of high density with high accuracy. Since the image forming apparatus forms pattern images by an area coverage modulation method, although the toner applying amount is changed, change of a reflection light amount is negligible in a high density region in which the toner applying amount of the pattern images covers the intermediate transfer belt 6. Therefore, the γ LUT generation unit 301 estimates an estimation density value Dmax of the pattern image corresponding to the maximum value of the signal input by the image forming unit in accordance with a result of the measurement performed on the pattern images by the density detection sensor 5. For example, the γ LUT generation unit 301 extrapolates a measurement result (the estimation density value Dmax) of the pattern image corresponding to the maximum value of the signal input by the image forming unit in accordance with a result of measurement performed on a pattern image having the highest density in the pattern images of nine tones and a result of measurement performed on a pattern image having the second highest density.

Next, a method for generating the γ LUT_B will be described. To convert a density characteristic (a solid line) of FIG. 6B into an ideal density characteristic (a dotted line) of FIG. 6B, a signal input by the image forming unit is replaced by a signal input by the image forming unit for forming a pattern image having target density corresponding to the signal input by the image forming unit. In this way, the γ LUT_B for correcting the signal input by the image forming unit is generated. Note that the γ LUT_B stored in the memory 40 in advance is data which does not change the signal input by the image forming unit. γ LUT_B is corrected when the automatic tone correction is executed.

In FIG. 6C, a graph (a dotted line) of the γ LUT_B before the correction and a graph (a solid line) of the γ LUT_B after the correction (represented by the γ LUT_B' in FIG. 6C) are illustrated. As illustrated in FIG. 6C, the γ LUT_B' after the correction and the density characteristic of FIG. 6B are line symmetrical with respect to the ideal density characteristic (the dotted line).

Figure 7:
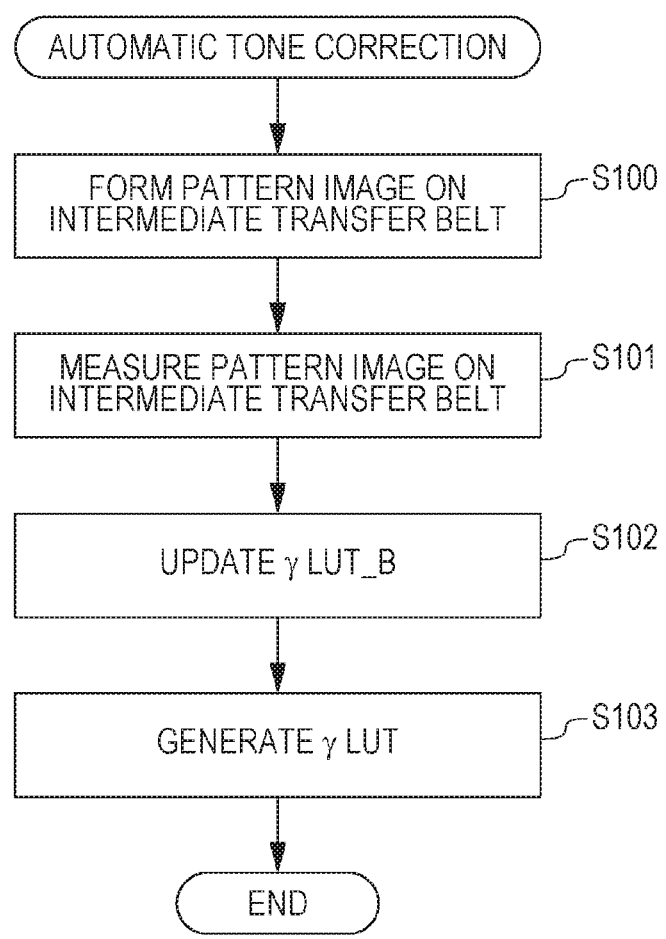
FIG. 7 is a flowchart illustrating automatic tone correction.

Hereinafter, the automatic tone correction for correcting the γ LUT_B will be described with reference to a flowchart of FIG. 7. Note that, in the automatic tone correction, the image forming station 10 forms a pattern image on the intermediate transfer belt 6 and the γ LUT_B is automatically corrected in accordance with a result of measurement performed by the density detection sensor 5 on the pattern image. That is, the user does not perform any operation in the automatic tone correction.

Figure 8:
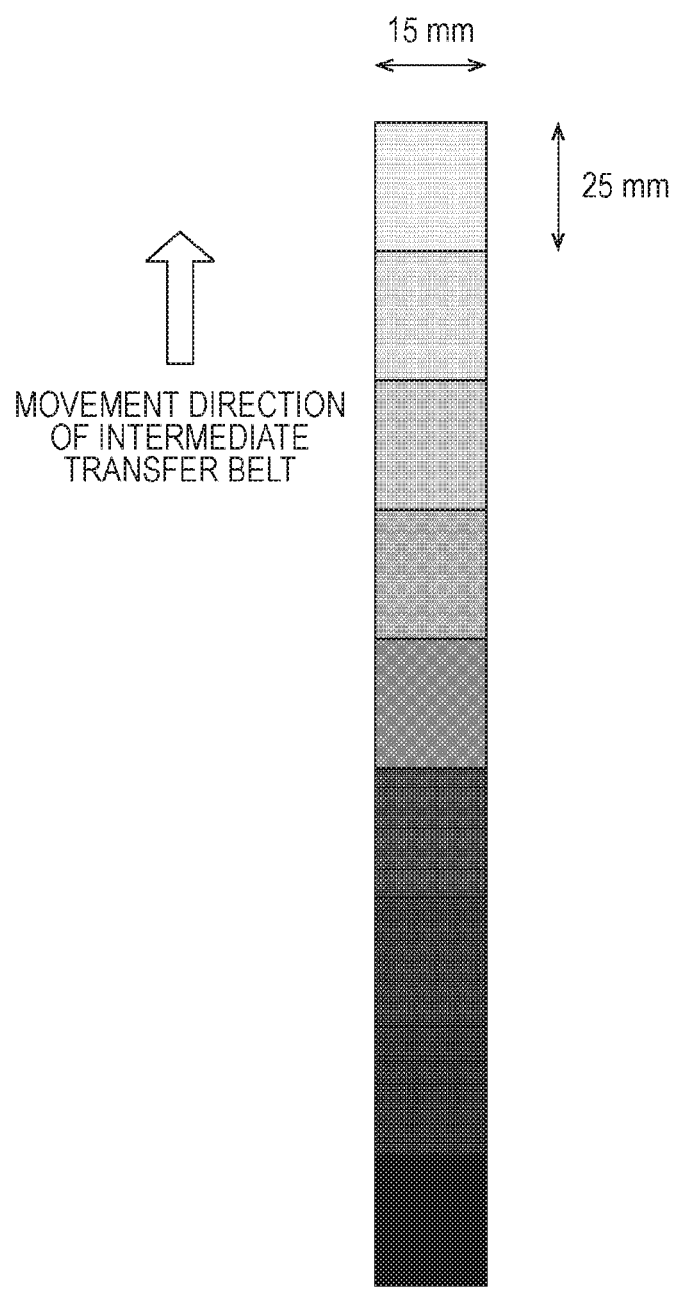
FIG. 8 is a diagram illustrating a pattern image.

The controller 303 executes the automatic tone correction illustrated in FIG. 8 in accordance with a program stored in the ROM 90. When the automatic tone correction is executed, the controller 303 forms pattern images on the intermediate transfer belt 6 (S100). The controller 303 causes the pattern generator 70 to output pattern image data. The controller 303 causes the γ correction unit 62 to correct the pattern image data in accordance with the γ LUT_A. The image forming station 10 forms pattern images of nine tones of different density levels on the intermediate transfer belt 6 in accordance with the pattern image data corrected by the γ correction unit 62. In step S100, the image forming station 10 functions as the image forming unit which forms pattern images. The intermediate transfer belt 6 corresponds to an image-bearing member which carries the pattern images.

FIG. 8 is a diagram schematically illustrating the pattern images formed on the intermediate transfer belt 6. The pattern images of nine tones have different density levels for each color. Specifically, 36 measurement images are formed in total for yellow, magenta, cyan, and black. A length of one pattern image is 25 mm in a conveying direction of the intermediate transfer belt 6 and 15 mm in a direction orthogonal to the conveying direction, for example. The nine pattern images are formed in accordance with 8-bit signal values of 9, 36, 64, 90, 117, 144, 171, 200, and 225, for example.

Subsequently, the controller 303 measures the pattern images by the density detection sensor 5 (S101). In step S101, a sensor output value is output every 2 msec while the pattern images pass the measurement position of the density detection sensor 5. The density detection sensor 5 performs measurement 25 times on each of the pattern images. The A/D conversion circuit 56 converts the sensor output value into a sensor output value of a digital signal. The controller 303 averages 23 sensor output values, except for a maximum value and a minimum value, in 25 sensor output values. Then the controller 303 causes the density conversion circuit 55 to convert an average value of the sensor output values into print density in accordance with both of the conversion tables 55a and 55b.

The controller 303 updates the γ LUT_B in accordance with the print density of the pattern images measured in step S101 (step S102). The controller 303 causes the γ LUT generation unit 301 to determine a density characteristic in accordance with a result of the print density measured in step S101. Then the γ LUT generation unit 301 updates the γ LUT_B as described with reference to FIG. 6. The controller 303 causes the γ LUT generation unit 301 to combine the γ LUT_A and the γ LUT_B so as to generate the γ LUT_C (S103), and thereafter, terminates the automatic tone correction.

Visual Correction

In a case where toner or paper dust adheres to the window portion 54 of the density detection sensor 5, a sensor output value includes an error. This is because, in a case where toner or paper dust adheres to the window portion 54, intensity of light emitted to a measurement image from the LED 51 is reduced or intensity of reflection light received by the photodiodes 52 and 53 is reduced. In the case where toner or paper dust adheres to the window portion 54, print density of a measurement image may not be detected with high accuracy since sensor output values of the photodiodes 52 and 53 include errors.

Furthermore, in a case where the surface of the intermediate transfer belt 6 has roughness since a large number of images are formed, the correspondence relationship between a sensor output value of a measurement image on the intermediate transfer belt 6 and print density of the measurement image changes. In the case where the surface of the intermediate transfer belt 6 has roughness, reflection light from the surface of the intermediate transfer belt 6 changes. Therefore, in particular, a sensor output value obtained when a measurement image of a low density corresponding to a low covering ratio of toner is measured includes an error. In the case where the surface of the intermediate transfer belt 6 has roughness, print density of a measurement image may not be detected with high accuracy since sensor output values of the photodiodes 52 and 53 include errors.

Furthermore, a rate (a transfer efficiency) of toner transferred from the intermediate transfer belt 6 to the sheet P in the secondary transfer nip portion T2 changes depending on temperature or humidity around the image forming apparatus. Therefore, in a case where the temperature or the humidity around the image forming apparatus changes, it is likely that the relationship between an amount of toner of a measurement image formed on the intermediate transfer belt 6 and density (print density) of the measurement image formed on the sheet P changes.

Furthermore, the rate (the transfer efficiency) of toner transferred from the intermediate transfer belt 6 to the sheet P in the secondary transfer nip portion T2 changes also in a case where the pair of secondary transfer rollers 9 is deteriorated with time. This is because a resistance value of the pair of secondary transfer rollers 9 changes since the pair of secondary transfer rollers 9 is deteriorated with time. Specifically, even in the case where the pair of secondary transfer rollers 9 changes with time, it is likely that the relationship between the amount of toner of the measurement image formed on the intermediate transfer belt 6 and the density (the print density) of the measurement image formed on the sheet P changes.

Therefore, since the correspondence relationship between the sensor output value and the print density is different from the preset correspondence relationship if the transfer efficiency changes, the density detection sensor 5 may not detect the print density of the measurement image with high accuracy.

Accordingly, to detect the print density of the measurement image with high accuracy in accordance with a result of the measurement performed on the measurement image on the intermediate transfer belt 6, the conversion table updating unit 302 changes the conversion table 55b in accordance with density information of the measurement image formed on the sheet P and the sensor output value of the measurement image. By this, even in a case where the window portion 54 of the density detection sensor 5 gets dirty, the conversion table 55b reduces a measurement error of the density detection sensor 5, and accordingly, a result of high-accuracy measurement performed on the measurement image may be compensated for. Furthermore, even in the case where the surface of the intermediate transfer belt 6 has roughness, the conversion table 55b reduces a measurement error of the density detection sensor 5, and accordingly, a result of high-accuracy measurement performed on the measurement image may be compensated for. Furthermore, even in a case where the transfer efficiency changes, the conversion table 55b converts a sensor output value into print density of the measurement image with high accuracy, and accordingly, the print density of the measurement image may be detected with high accuracy.

The visual correction for updating the conversion table 55b will be described hereinafter.

Figure 9:
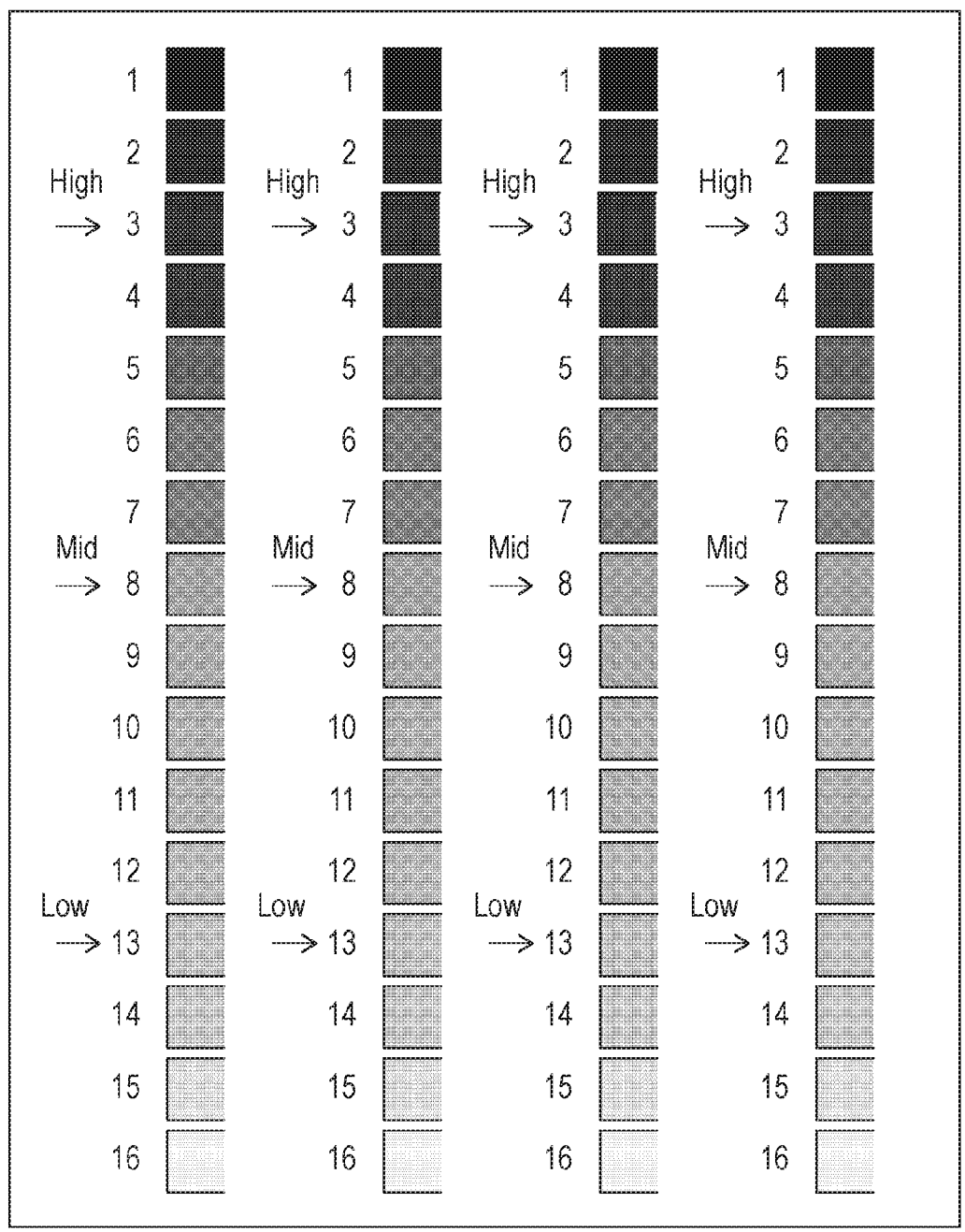
FIG. 9 is a diagram schematically illustrating a sample chart.

FIG. 9 is a diagram schematically illustrating a sample chart used in the visual correction. In the sample chart, 16 sample images for each color are printed. Furthermore, identification numbers 1 to 16, a mark indicating a target high density ("High" and an arrow mark), a mark indicating a target middle density ("Mid" and an arrow mark), a mark indicating a target low density ("Low" and an arrow mark) are printed beside some of the sample images.

Furthermore, the sample images have a rectangle shape, and black boundary lines are formed on three sides of each of the sample images. Spaces are provided between the adjacent sample images.

The sample chart is a color sample for identifying density of a test image on a test sheet printed by the image forming apparatus in the visual correction. Therefore, density levels of the sample images are adjusted in advance. The correspondence relationship between the identification numbers and the density levels in the density conversion table 81 (FIG. 2) is the same as the correspondence relationship between the identification numbers of the sample images printed on the sample chart and the density levels of the sample images.

Figure 10:
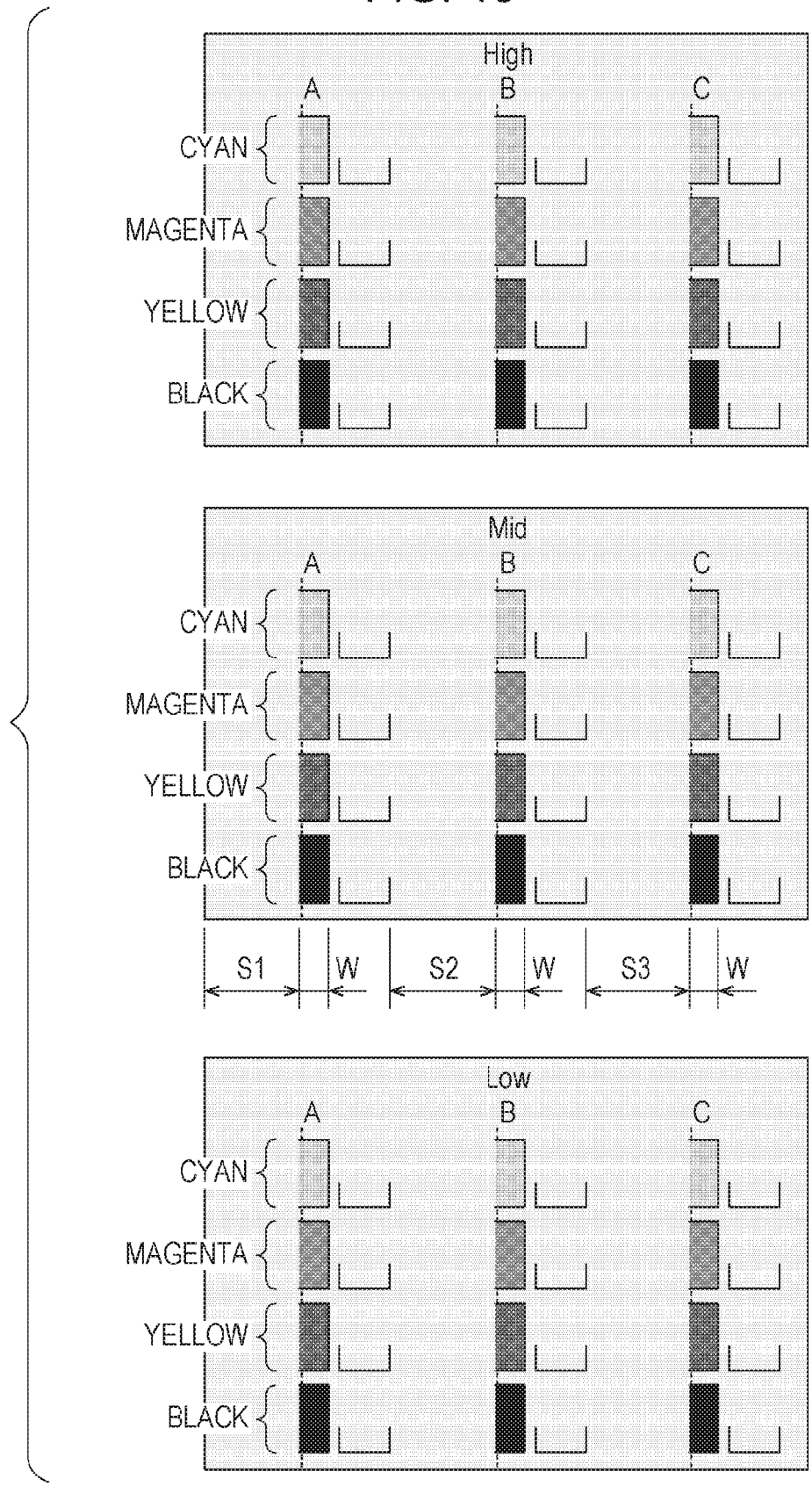
FIG. 10 is a diagram schematically illustrating test sheets.

FIG. 10 is a diagram schematically illustrating test sheets printed by the image forming apparatus when the visual correction is executed. The test sheets are the sheets P on which test images are formed as measurement images. The test sheets include three types of test sheets, that is, a test sheet for low density, a test sheet for middle density, and a test sheet for high density. In the test sheet for low density, a test image in which a target density level is 0.4, for example, is formed. In the test sheet for middle density, a test image in which a target density level is 0.8, for example, is formed. In the test sheet for high density, a test image in which a target density level is 1.2, for example, is formed.

Test images of cyan, magenta, yellow, and black are formed on each test sheet. In each of the test sheets, test images which have been subjected to different halftone processes are formed. For example, in an A column of in the test sheets, test images which have been subjected to screening using dither matrix performed by the halftone processor 63 are formed. For example, in a B column of in the test sheets, test images which have been subjected to screening using the error diffusion method performed by the halftone processor 63 are formed.

The test images have a rectangle shape, and black boundary lines are formed on three sides of each of the test images. The boundary line is not formed on one of long sides of each of the test images. Specifically, the boundary lines are formed on the sides other than the side to be adjacent to the sample images in the test images. A dotted line is formed on an extension of the side in which the boundary line is not formed in each of the test images. The user bends the test sheets along the dotted lines. The dotted lines do not overlap with the test images.

Images of a U-shape are formed on right sides of the test images. The user inputs the identification numbers of the sample images in these regions. A length W of short sides of the test images is smaller than a length S1 of a margin region which does not include any image and which is positioned on a left side of the test images in the A column. The length W of the short sides of the test images is smaller than a length S2 of a margin region which does not include any image and which is positioned between the A column and the B column. The length W of the short sides of the test images is smaller than a length S3 of a margin region which does not include any image and which is positioned between the B column and a C column.

Figure 11A:
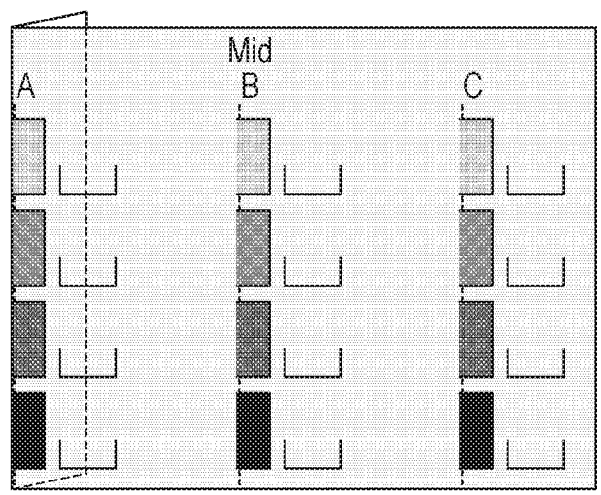
FIGS. 11A to 11C are diagrams schematically illustrating states in which the test sheet is bent.
Figure 11B:
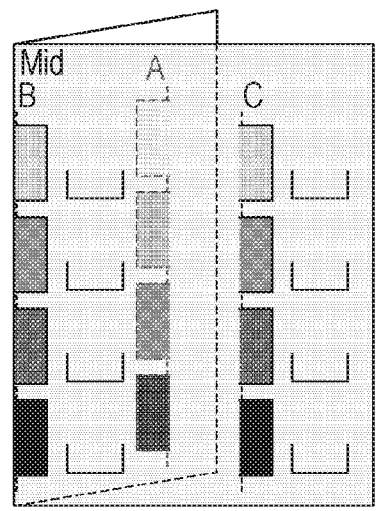
Figure 11C:
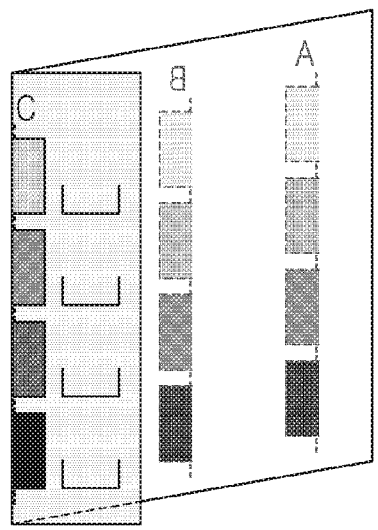

FIGS. 11A to 11C are diagrams schematically illustrating states in which the test sheet is bent along dotted lines. FIG. 11A is a diagram illustrating a state in which the test sheet is bent so that the user compares the test images in the A column with the sample chart. FIG. 11B is a diagram illustrating a state in which the test sheet is bent so that the user compares the test images in the B column with the sample chart. FIG. 11C is a diagram illustrating a state in which the test sheet is bent so that the user compares the test images in the C column with the sample chart.

In FIG. 11A, since the length W of the short sides of the test images in the A column is shorter than the length S1 of the margin region, the margin region is positioned on a back side of the test images in the A column. Accordingly, the user may determine density levels of the test images in the A column with high accuracy. Similarly, in FIG. 11B, since the length W of the short sides of the test images in the B column is shorter than the length S2 of the margin region, the margin region is positioned on a back side of the test images in the B column. Accordingly, the user may determine density levels of the test images in the B column with high accuracy. Furthermore, since the length W of the short sides of the test images in the C column is shorter than the length S3 of the margin region, the margin region is positioned on a back side of the test images in the C column. Accordingly, the user may determine density levels of the test images in the C column with high accuracy. Since the sizes described above are set, even in a case where the test sheet is bent, a density level of a test image which is focused by the user is prevented from being mistakenly detected as a density level of another image.

Figure 12:
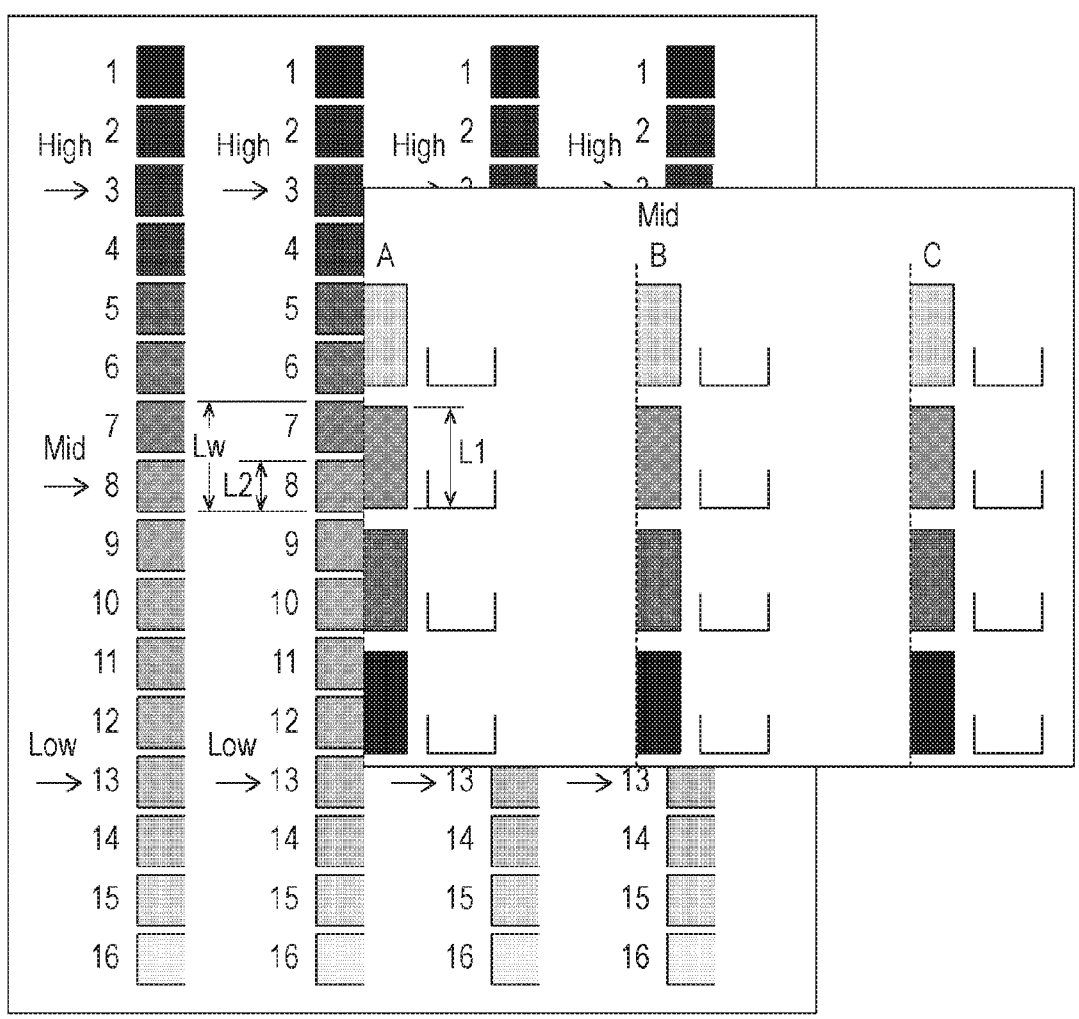
FIG. 12 is a diagram schematically illustrating a state in which the test sheet is superposed on the sample chart.

FIG. 12 is a diagram schematically illustrating a state in which one of the test sheets which is bent is superposed on the sample chart. The user compares one of the test images on the test sheet with the sample images in the sample chart as illustrated in FIG. 12. A length L1 of long sides of the test image is longer than a length L2 of one side of the sample image. Furthermore, the length L1 of the long sides of the test image is equal to a total sum Lw of a sum of lengths of adjacent two sample images which are the same color and a length of a space between the two sample images. Therefore, one of the adjacent two sample images in the sample chart which has a density level more similar to that of the test image may be easily determined.

In the visual correction, the user compares the test image on the test sheet with the sample images in the sample chart. Subsequently, the user determines one of the sample images having a density level most similar to the density level of the test image. Then the user inputs an identification number of the sample image having the density level which is most similar to the density level of the test image in the operation unit 80 in accordance with guidance displayed in the liquid crystal screen of the operation unit 80.

For example, in a case where a density level of one of the sample images which is indicated by an identification number "10" is most similar to a density level of one of the test images of the middle density, the user inputs "10" using the numerical keypad of the operation unit 80. The density conversion table 81 outputs the density level of the sample image corresponding to the identification number. The operation unit 80 inputs information on the density level of the test image visually determined by the user. The identification number input from the operation unit 80 corresponds to information on the density level of the test image (a user instruction). Specifically, the conversion table updating unit 302 receives the user instruction based on a result of the comparison between the sample images and the test image performed by the user from the operation unit 80.

Operations performed by the various units included in the image forming apparatus in a case where the visual correction is executed will now be described with reference to a flowchart of FIG. 13. The visual correction is executed when a command for instructing execution of the visual correction is input by the user operating the mode selection button of the operation unit 80. Note that the controller 303 executes the visual correction illustrated in FIG. 13 by controlling the various units included in the image forming apparatus in accordance with a program stored in the ROM 90.

First, the image forming apparatus starts print of test sheets (S131). In step S131, a γ LUT setting unit 65 sets the γ LUT_C stored in the memory 40 to the γ correction unit 62. The pattern generator 70 outputs test image data. The γ correction unit 62 corrects the test image data in accordance with the γ LUT_C. The image forming station 10 forms test images on the intermediate transfer belt 6 in accordance with the corrected test image data. The pair of secondary transfer rollers 9 and the power source unit transfer the test images on the intermediate transfer belt 6 to the sheet P, the fixing device 100 fixes the test images on the sheet P, and a conveying roller, not illustrated, discharges the test sheets from the image forming apparatus.

In step S131, the image forming station 10 functions as the image forming unit which forms the test images. The pair of secondary transfer rollers 9 functions as a transfer unit which transfers the test images on the intermediate transfer belt 6 to the sheet P. The fixing device 100 functions as a fixing unit which fixes the test images on the sheet P. The γ correction unit 62 functions as a correction unit which corrects the test image data in accordance with the γ LUT. The controller 303 functions as a control unit which causes the γ correction unit 62 to correct the test image data and which causes the image forming station 10 to form the test images on the sheet P.

Next, the image forming apparatus forms test images on the intermediate transfer belt 6 (S132). The pattern generator 70 outputs test image data to the γ correction unit 62. The γ correction unit 62 corrects the test image data in accordance with the γ LUT_C. Here, an image forming condition for forming test images is the same as the image forming condition for forming the test sheets in step S131. Note that the image forming condition includes charge voltages of the chargers 2Y, 2M, 2C, and 2K, light intensity of laser light of the exposing devices 3Y, 3M, 3C, and 3K, and transfer voltages applied to the primary transfer rollers 7Y, 7M, 7C, and 7K.

The image forming station 10 functions as the image forming unit which forms the test images on the intermediate transfer belt 6 in step S132. The γ correction unit 62 functions as a correction unit which corrects the test image data in accordance with the γ LUT_C. The controller 303 functions as a control unit which causes the γ correction unit 62 to correct the test image data and which causes the image forming station 10 to form the test images on the intermediate transfer belt 6.

Subsequently, the density detection sensor 5 measures the test images on the intermediate transfer belt 6 (S133). In step S133, the LED 51 starts light emission before the test images on the intermediate transfer belt 6 reach the measurement position. The A/D conversion circuit 56 converts a voltage value output from the photodiode 52 (or 53) into a digital signal at timings when the test images on the intermediate transfer belt 6 pass the measurement position. The density conversion circuit 55 converts the digital signal output from the A/D conversion circuit 56 into a density value only in accordance with the conversion table 55a.

Although the image forming station 10 forms the test images twice in step S131 and step S132, the test images may be formed only once. In this case, the density detection sensor 5 measures the test images on the intermediate transfer belt 6 before the test images are transferred to the sheet P.

Subsequently, the image forming apparatus waits until information on density of one of the test images visually determined by the user is input (S134). The image forming apparatus waits until an identification number of a sample image having a density level which is most similar to that of the test image is input using the operation unit 80. When the identification number is input using the operation unit 80, the density conversion table 81 outputs a density level of the sample image corresponding to the identification number as a density level of the test image.

When the information on density levels of the test images visually determined by the user are input to all the test images printed by the image forming apparatus in step S131, the image forming apparatus updates the conversion table 55b (S136). The conversion table updating unit 302 updates the conversion table 55b such that the density levels of the test images converted using the conversion table 55a in step S133 match density levels of the test images output from the density conversion table 81 in step S134. By this, a conversion condition for converting a result of the measurement performed by the density detection sensor 5 is generated. The image forming apparatus then terminates the visual correction.

Figure 14:
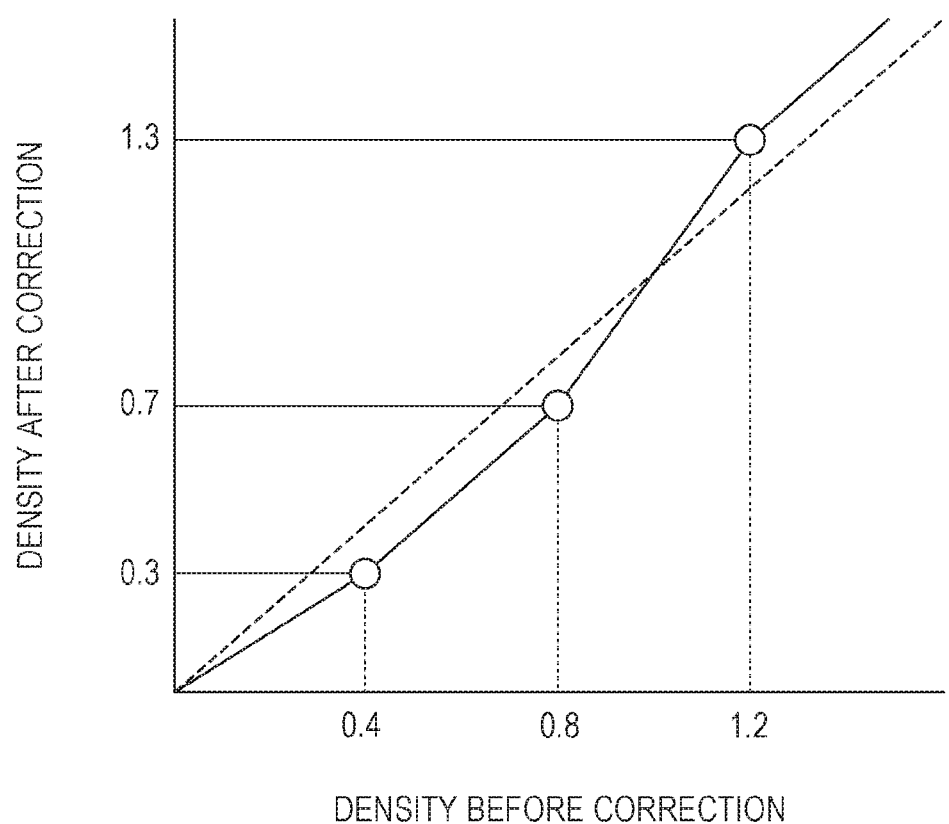
FIG. 14 is a diagram schematically illustrating a state in which the conversion table is updated.

A method for updating the conversion table 55b employed in the conversion table updating unit 302 will be described hereinafter with reference to FIG. 14. FIG. 14 is a diagram illustrating a graph (a dotted line) of the conversion table 55b before the correction and a graph (a solid line) of the conversion table 55b after the correction.

The conversion table updating unit 302 generates a first region of the conversion table 55b in accordance with Expressions 1 and 2. The first region corresponds to a range from a density value of 0 to a density value DA of a test image A determined using the density detection sensor 5 and the conversion table 55a.

$$D' = \alpha 1 \times D \qquad \text{Expression 1}$$

$$\alpha 1 = (DA2-0)/(DA1-0) \qquad \text{Expression 2}$$

Here, D denotes a density value before the conversion is performed in accordance with the conversion table 55b and D' denotes a density value after the conversion is performed in accordance with the conversion table 55b. Furthermore, $\alpha 1$ denotes a correction coefficient used by the conversion table 55b to correct density values in the first region. DA1 denotes a density value of the test image A on the intermediate transfer belt 6 measured by the density detection sensor 5. DA2 denotes a density value of the test image A on the sheet P visually determined by the user. DA2 is determined with reference to a density conversion table in accordance with the identification number input using the operation unit 80.

The conversion table updating unit 302 divides the density value of the test image A visually determined by the user by the density value of the test image A measured by the density detection sensor 5 so as to calculate the correction coefficient $\alpha 1$ of the first region. By this, the conversion table 55b which is used to correct a shift between the print density obtained by visual check by the user and the density value determined using the density detection sensor 5 and the conversion table 55a is generated in the first region.

The conversion table updating unit 302 generates a second region of the conversion table 55b in accordance with Expressions 3, 4, and 5. The second region corresponds to a range from the density value DA of the test image A determined using the density detection sensor 5 and the conversion table 55a to a density value DB of a test image B determined using the density detection sensor 5 and the conversion table 55a.

$$D' = \alpha 2 \times D + \beta 1 \qquad \text{Expression 3}$$

$$\alpha 2 = (DB2-DA2)/(DB1-DA1) \qquad \text{Expression 4}$$

$$\beta 1 = DB2 - \alpha 2 \times DB1 \qquad \text{Expression 5}$$

Here, D denotes a density value before the conversion is performed in accordance with the conversion table 55b and D' denotes a density value after the conversion is performed in accordance with the conversion table 55b. Furthermore, $\alpha 2$ and $\beta 1$ denote correction coefficients used by the conversion table 55b to correct a density value in the second region. DB1 denotes a density value of the test image B on the intermediate transfer belt 6 measured by the density detection sensor 5. DB2 denotes a density value of the test image B on the sheet P visually determined by the user. DB2 is determined with reference to the density conversion table in accordance with an identification number input using the operation unit 80.

The conversion table updating unit 302 divides the density value of the test image B visually determined by the user by the density value of the test image B measured by the density detection sensor 5 so as to calculate the correction coefficient $\alpha 2$ of the second region. The conversion table updating unit 302 calculates the correction coefficient $\beta 1$ in accordance with the correction coefficient $\alpha 2$, the density value of the test image B measured by the density detection sensor 5, and the density value of the test image B visually determined by the user. By this, the conversion table 55b which is used to correct a shift between the print density obtained by visual check by the user and the density value determined using the density detection sensor 5 and the conversion table 55a is generated in the second region. Note that the conversion table updating unit 302 may calculate the correction coefficient $\beta 1$ in accordance with the correction coefficient $\alpha 2$, the density value of the test image A measured by the density detection sensor 5, and the density value of the test image A visually determined by the user.

The conversion table updating unit 302 generates a third region of the conversion table 55b in accordance with Expressions 6, 7, and 8. The third region corresponds to a range from the density value DB of the test image B determined using the density detection sensor 5 and the conversion table 55a to a density value DC of a test image C determined using the density detection sensor 5 and the conversion table 55a.

$$D' = \alpha 3 \times D + \beta 2 \qquad \text{Expression 6}$$

$$\alpha 3 = (DC2-DB2)/(DC1-DB1) \qquad \text{Expression 7}$$

$$\beta 2 = DC2 - \alpha 3 \times DC1 \qquad \text{Expression 8}$$

Here, D denotes a density value before the conversion is performed in accordance with the conversion table 55b and D' denotes a density value after the conversion is performed in accordance with the conversion table 55b. Furthermore, $\alpha 3$ and $\beta 2$ denote correction coefficients used by the conversion table 55b to correct a density value in the third region. DC1 denotes a density value of the test image C on the intermediate transfer belt 6 measured by the density detection sensor 5. DC2 denotes a density value of the test image C on the sheet P visually determined by the user. DC2 is determined with reference to the density conversion table in accordance with an identification number input using the operation unit 80.

The conversion table updating unit 302 divides the density value of the test image C visually determined by the user by the density value of the test image C measured by the density detection sensor 5 so as to calculate the correction coefficient α3 of the third region. The conversion table updating unit 302 calculates the correction coefficient β2 in accordance with the correction coefficient α3, the density value of the test image C measured by the density detection sensor 5, and the density value of the test image C visually determined by the user. By this, the conversion table 55b which is used to correct a shift between the print density obtained by visual check by the user and the density value determined using the density detection sensor 5 and the conversion table 55a is generated in the third region. Note that the conversion table updating unit 302 may calculate the correction coefficient β2 in accordance with the correction coefficient α3, the density value of the test image B measured by the density detection sensor 5, and the density value of the test image B visually determined by the user.

The conversion table updating unit 302 generates a fourth region of the conversion table 55b in accordance with Expressions 9 and 10. The fourth region corresponds to a range of density values higher than the density value of the test image C measured by the density detection sensor 5.

$$D' = D + \beta 3 \qquad \text{Expression 9}$$

$$\beta = DC2 - DC1 \qquad \text{Expression 10}$$

Here, D denotes a density value before the conversion is performed in accordance with the conversion table 55b and D' denotes a density value after the conversion is performed in accordance with the conversion table 55b. Furthermore, β3 denotes a correction coefficient used by the conversion table 55b to correct a density value in the fourth region. DC1 denotes a density value of the test image C on the intermediate transfer belt 6 measured by the density detection sensor 5. DC2 denotes a density value of the test image C on the sheet P visually determined by the user. DC2 is determined with reference to the density conversion table in accordance with an identification number input using the operation unit 80.

The conversion table updating unit 302 calculates the correction coefficient β3 by subtracting the density value of the test image C visually determined by the user from the density value of the test image C measured by the density detection sensor 5.

Figure 13:
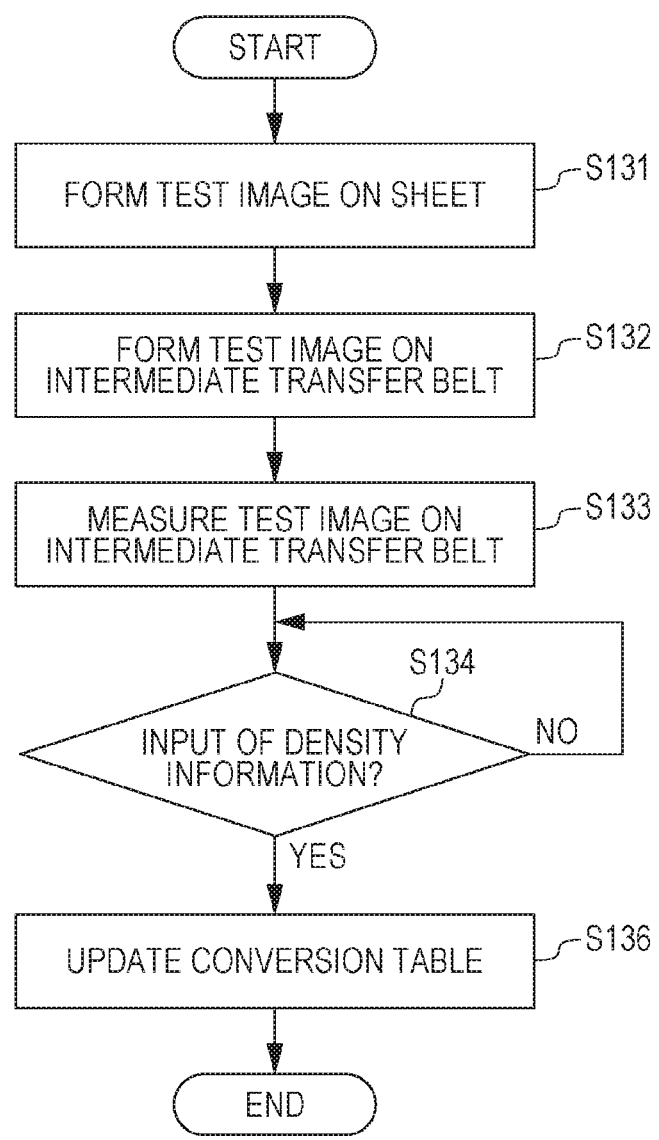
FIG. 13 is a flowchart illustrating visual correction.

In step S136 of FIG. 13, the conversion table updating unit 302 generates the conversion table 55b by combining the first region of the conversion table 55b, the second region of the conversion table 55b, the third region of the conversion table 55b, and the fourth region of the conversion table 55b. The conversion table 55b is stored in the memory 40.

For example, as information on density visually measured by the user, in a case where a density level of the test image A is 0.3, a density level of the test image B is 0.7, and a density level of the test image C is 1.3, the correction coefficients α1, α2, α3, β1, β2, and β3 are determined as follows.

In the first region corresponding to a density level before the conversion in a range from 0 to 0.4 inclusive, the correction coefficient α1 is ¾. In the second region corresponding to a density value before the conversion in a range larger than 0.4 and equal to or smaller than 0.8, the correction coefficient α2 is 1 and the correction coefficient β1 is −0.1. In the third region corresponding to a density value before the conversion in a range larger than 0.8 and equal to or smaller than 1.2, the correction coefficient α3 is 1.5 and the correction coefficient β2 is −0.5. In the fourth region corresponding to a density value before the conversion in a range larger than 1.2, the correction coefficient β3 is 0.1.

A conversion table updating unit 302 generates the conversion table 55b in accordance with information on density of a test image visually input by the user and a sensor output value of the density detection sensor 5. Therefore, a measurement error of the density detection sensor 5 may be reduced and a high-accuracy measurement result may be ensured.

Furthermore, the γ LUT_C is generated in accordance with a result of measurement performed by the density detection sensor 5 on the pattern image. Therefore, if print density of a measurement image may be measured with high accuracy in accordance with the conversion table 55b, a density characteristic of an image formed by the image forming apparatus on the sheet P may be corrected with high accuracy.

Furthermore, in the foregoing description, examples of measurement images formed in the visual correction correspond to the test images A, B, and C having different density levels. However, the number of test images formed on the sheet P so as to correct the conversion table 55b may be arbitrarily set. For example, in a case where only one test image is used, the conversion table 55b is generated such that a density level of 0 before the conversion is converted into a density level of 0 after the conversion, and a density value converted using the density detection sensor 5 and the conversion table 55a matches print density visually determined by the user. Assuming that a density value converted using the density detection sensor 5 and the conversion table 55a is denoted by V and print density visually determined by the user is denoted by W, the conversion table updating unit 302 generates the conversion table 55b in accordance with Expression 11.

$$D' = (W/V) \times D \qquad \text{Expression 11}$$

Note that D denotes a density value after the conversion is performed in accordance with the conversion table 55a and D' denotes a density value after the conversion is performed in accordance with the conversion table 55b. The conversion table 55b is a function of an inclination W/V which passes an intersection between the density value converted using the density detection sensor 5 and the conversion table 55a and the print density visually determined by the user.

Furthermore, although the γ LUT_C is used when the γ correction unit 62 corrects the test image data in the description above, the γ LUT_A stored in advance may be used. For example, in a case where the printer characteristic is considerably changed since the photoconductive drum 1 and the developer device 4 of the image forming apparatus are changed, it is more possible that the conversion table 55b is updated with high accuracy when the γ LUT_A for correcting the printer characteristic when the image forming apparatus operates in a standard state is used.

Furthermore, in a case where the visual correction is executed, the automatic tone correction may be executed before a test sheet is printed and the γ LUT_C suitable for the printer characteristic of the image forming apparatus may be generated.

Moreover, although the sample images in the sample chart and the test images on the test sheet are measurement images having a rectangle shape, the shape is not limited to rectangle. The shape of the sample images and the test images may be triangle or a circle in which a portion thereof is cut out.

COMPARATIVE EXAMPLE

Figure 15A:
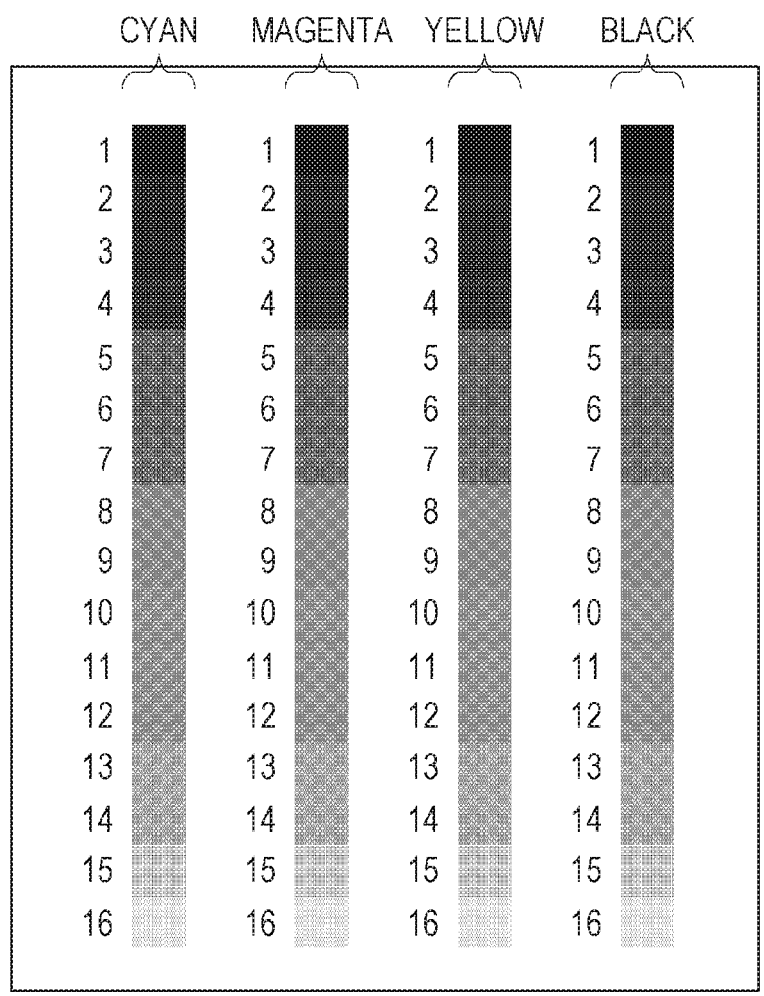
FIGS. 15A and 15B are diagrams schematically illustrating a sample chart and a test sheet of a comparison example, respectively.
Figure 15B:
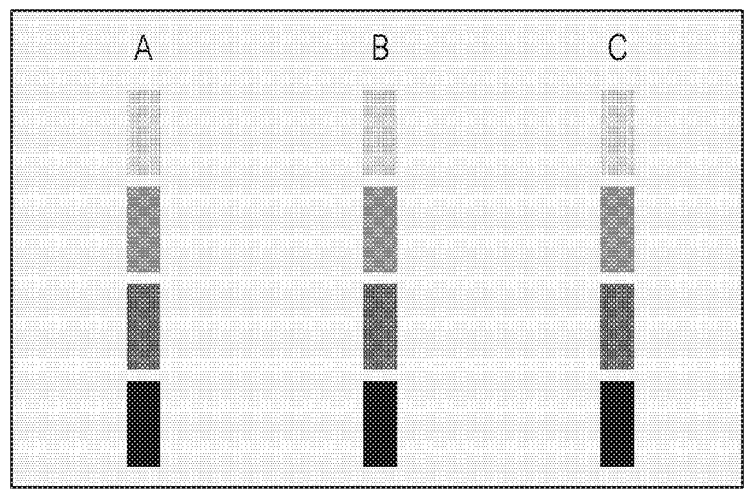

According to the present invention, the sample chart illustrated in FIG. 9 and the test sheets illustrated in FIG. 10 are used in the visual correction. The sample chart and the test sheets according to the present invention improve accuracy of a determination visually performed by the user as described below. FIG. 15A is a diagram of a comparative example of a sample chart, and FIG. 15B is a diagram of a comparative example of a test sheet.

In the sample chart of FIG. 15A, boundary lines of sample images are not formed, and the sample images are connected to one another. In the test sheet of FIG. 15B, boundary lines of test images are not formed.

Figure 16A:
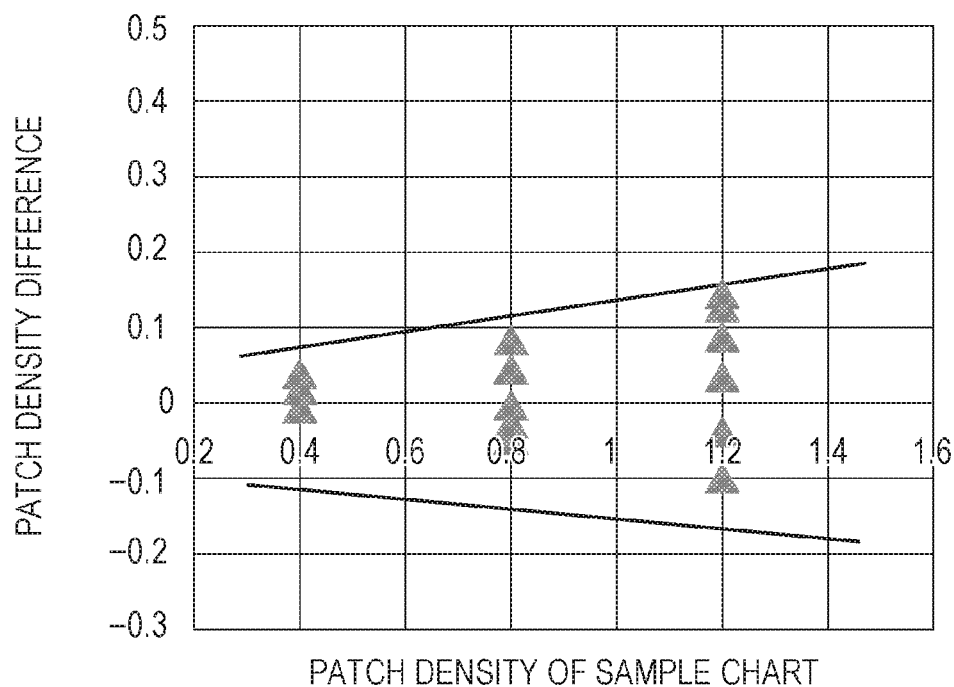
FIGS. 16A and 16B are graphs illustrating results of experiment of accuracy of visual density determination.
Figure 16B:
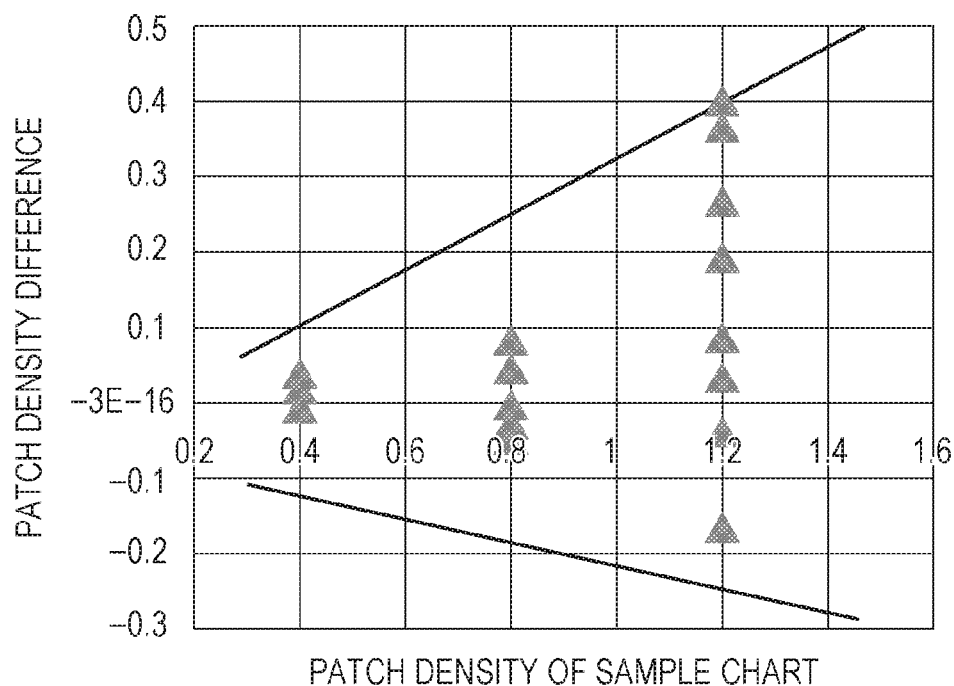

FIGS. 16A and 16B are diagrams illustrating results of experiments for measuring a difference between density of a test image on the test sheet visually determined by the user and precise density of the test image. FIG. 16A is a graph illustrating a result of an experiment performed when the sample chart and the test sheet according to the present invention are used. FIG. 16B is a graph illustrating a result of an experiment performed when the sample chart and the test sheet according to the comparative example are used.

In the test sheet, three test images having density levels of 0.4, 0.8, and 1.2 are formed. In the comparison example of FIG. 16B, a density difference on a low density side is equal to or smaller than ±0.1 and a density difference on a high density side is ±0.4. On the other hand, according to the experiment of the present invention illustrated FIG. 16A, a density difference on a low density side is equal to or smaller than ±0.1 and a density difference on a high density side is equal to or smaller than ±0.2. By this, a determination error may be more reliably suppressed in a case where the sample chart and the test sheet including the sample images and the test images, respectively, having the boundary lines according to the present invention are used when compared with a case where the sample chart and the test sheet which do not include any boundary line according to the comparative example are used.

As is apparent from the experiment results illustrated in FIGS. 16A and 16B, the accuracy of a determination visually performed by the user is improved when the boundary lines are formed in the sample images and the test images. According to the present invention, the conversion table 55b may be corrected with high accuracy since the boundary lines and the spaces are provided in the sample images and the test images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-060148, filed Mar. 23, 2015, which is hereby incorporated by reference herein in its entirety.

What is claimed is:

1. An image forming apparatus comprising:
a correction unit configured to correct image data based on a correction condition;
an image forming unit configured to form an image based on the corrected image data;
an image bearing member configured to bear the image formed by the image forming unit;
a transfer unit configured to transfer the image on the image bearing member to a sheet;
a measurement unit configured to measure a measurement image on the image bearing member;
a conversion unit configured to convert a measurement result of the measurement image based on a conversion condition;
a first generation unit configured to generate the correction condition based on the measurement result converted by the conversion unit;
an obtaining unit configured to control the image forming unit to form a test image based on test image data, control the measurement unit to measure the test image on the image bearing member, and obtain a measurement result of the test image;
a controller configured to control the image forming unit to form a test image based on test image data, and control the transfer unit to transfer the test image formed on the image bearing member to the sheet;
a reception unit configured to receive a user instruction based on a result of comparison between a sample image and the test image by a user; and
a second generation unit configured to generate the conversion condition based on the user instruction and the measurement result of the test image by the obtaining unit,
wherein
the test image on the sheet includes a first test image, a second test image, and an image indicating a position where the sheet is to be bent, and
in a case where the sheet is bent along the position, a position of the first test image and a position of the second test image do not overlap with each other.

2. The image forming apparatus according to claim 1,
wherein the position where the sheet is to be bent includes a first position adjacent to the first test image and a second position adjacent to the second test image,
in a case where the sheet is bent along the first position, the position of the first test image and the position of the second test image do not overlap with each other, and
in a case where the sheet is bent along the second position, the position of the first test image and the position of the second test image do not overlap with each other.

3. The image forming apparatus according to claim 2,
wherein the image indicating the position where the sheet is to be bent includes a first auxiliary image indicating the first position and a second auxiliary image indicating the second position.

4. The image forming apparatus according to claim 2,
wherein the test image on the sheet includes a first frame line of the first test image and a second frame line of the second test image,
the first frame line is formed adjacent to sides of the first test image other than a side adjacent to the first position, and
the second frame line is formed adjacent to sides of the second test image other than a side adjacent to the second position.

5. The image forming apparatus according to claim 1,
wherein the sample image includes a first sample image and a second sample image, and
density of the first sample image is different from density of the second sample image.

6. The image forming apparatus according to claim 5,
wherein a space is provided between the first sample image and the second sample image.

7. The image forming apparatus according to claim 1,
wherein the sample image includes identification information corresponding to the sample image, and
the user instruction corresponds to the identification information input by the user.

8. The image forming apparatus according to claim 1,
wherein the correction condition corresponds to a tone correction table for correcting a tone characteristic of the image data.

9. The image forming apparatus according to claim 1,
wherein the test image formed by the controller is the same as the test image formed by the obtaining unit.

10. The image forming apparatus according to claim 1,
wherein the conversion unit converts the measurement result of the measurement image into density data based on the conversion condition.

11. An image forming apparatus comprising:
a correction unit configured to correct image data based on a correction condition;
an image forming unit configured to form an image based on the corrected image data;
an image bearing member configured to bear the image formed by the image forming unit;
a transfer unit configured to transfer the image on the image bearing member to a sheet;
a measurement unit configured to measure a measurement image on the image bearing member;
a conversion unit configured to convert a measurement result of the measurement image based on a conversion condition;
a first generation unit configured to generate the correction condition based on the measurement result converted by the conversion unit;
a controller configured to control the image forming unit to form a test image, control the measurement unit to measure the test image on the image bearing member, and control the transfer unit to transfer the test image formed on the image bearing member to the sheet;
a reception unit configured to receive a user instruction based on a result of comparison between a sample image and the test image by a user; and
a second generation unit configured to generate the conversion condition based on the user instruction and the measurement result of the test image,
wherein
the test image on the sheet includes a first test image, a second test image, and an image indicating a position where the sheet is to be bent, and
in a case where the sheet is bent along the position, a position of the first test image and a position of the second test image do not overlap with each other.

12. The image forming apparatus according to claim 11,
wherein the position where the sheet is to be bent includes a first position adjacent to the first test image and a second position adjacent to the second test image,
in a case where the sheet is bent along the first position, the position of the first test image and the position of the second test image do not overlap with each other, and
in a case where the sheet is bent along the second position, the position of the first test image and the position of the second test image do not overlap with each other.

13. The image forming apparatus according to claim 12,
wherein the image indicating the position where the sheet is to be bent includes a first auxiliary image indicating the first position and a second auxiliary image indicating the second position.

14. The image forming apparatus according to claim 12,
wherein the test image on the sheet includes a first frame line of the first test image and a second frame line of the second test image,
the first frame line is formed adjacent to sides of the first test image other than a side adjacent to the first position, and
the second frame line is formed adjacent to sides of the second test image other than a side adjacent to the second position.

15. The image forming apparatus according to claim 11,
wherein the sample image includes a first sample image and a second sample image, and
density of the first sample image is different from density of the second sample image.

16. The image forming apparatus according to claim 15,
wherein a space is provided between the first sample image and the second sample image.

17. The image forming apparatus according to claim 11,
wherein the sample image includes identification information corresponding to the sample image, and
the user instruction corresponds to the identification information input by the user.

18. The image forming apparatus according to claim 11,
wherein the correction condition corresponds to a tone correction table for correcting a tone characteristic of the image data.

19. The image forming apparatus according to claim 11,
wherein the conversion unit converts a measurement result of the measurement image measured by the measurement unit into density data based on the conversion condition.

20. A method for controlling an image forming apparatus including
an image bearing member,
a correction unit configured to correct image data based on a correction condition,
an image forming unit configured to form an image based on the image data corrected by the correction unit,
a transfer unit configured to transfer the image on the image bearing member to a sheet,
a measurement unit configured to measure a measurement image on the image bearing member, and
a reception unit configured to receive a user instruction,
the method comprising:
measuring the measurement image formed by the image forming unit on the image bearing member using the measurement unit;
converting a measurement result of the measurement image based on a conversion condition;
generating the correction condition based on the converted measurement result;
measuring a test image formed by the image forming unit on the image bearing member using the measurement unit;
transferring the test image formed on the image bearing member to the sheet using the transfer unit;

receiving a user instruction based on a result of comparison between a sample image and the test image by a user using the reception unit; and generating the conversion condition based on the received user instruction and the measurement result of the test image, wherein the test image on the sheet includes a first test image, a second test image, and an image indicating a position where the sheet is to be bent, and in a case where the sheet is bent along the position, a position of the first test image and a position of the second test image do not overlap with each other.

* * * * *